US006493673B1

(12) United States Patent
Ladd et al.

(10) Patent No.: US 6,493,673 B1
(45) Date of Patent: *Dec. 10, 2002

(54) MARKUP LANGUAGE FOR INTERACTIVE SERVICES AND METHODS THEREOF

(75) Inventors: David Ladd, Downers Grove, IL (US); Gregory Johnson, Carol Stream, IL (US)

(73) Assignee: Motorola, Inc., Schaumburg, IL (US)

( * ) Notice: Subject to any disclaimer, the term of this patent is extended or adjusted under 35 U.S.C. 154(b) by 48 days.

This patent is subject to a terminal disclaimer.

(21) Appl. No.: 09/644,638

(22) Filed: Aug. 23, 2000

Related U.S. Application Data

(63) Continuation of application No. 09/165,487, filed on Oct. 2, 1998.
(60) Provisional application No. 60/094,131, filed on Jul. 24, 1998, and provisional application No. 60/094,032, filed on Jul. 24, 1998.

(51) Int. Cl.[7] ............................. G10L 21/00; G06F 15/00
(52) U.S. Cl. ..................... 704/275; 704/270; 704/270.1; 379/88.01
(58) Field of Search ................................. 704/260, 270, 704/275; 379/88.13, 88.17, 88.22, 88.01

(56) References Cited

U.S. PATENT DOCUMENTS

| 5,649,117 A | 7/1997 | Landry ......................... 395/240 |
| 5,655,008 A | 8/1997 | Futch et al. ............. 379/91.01 |
| 5,860,073 A | 1/1999 | Ferrel et al. ................. 707/522 |
| 5,877,766 A | 3/1999 | Bates et al. .................. 345/357 |
| 5,899,975 A | 5/1999 | Nielsen ........................ 704/260 |
| 5,915,001 A | 6/1999 | Uppaluru ................. 379/88.22 |
| 5,953,392 A | 9/1999 | Rhie et al. ............... 379/88.13 |
| 6,240,391 B1 * | 5/2001 | Ball et al. .................... 704/270 |
| 6,269,336 B1 * | 7/2001 | Ladd et al. .................. 704/270 |
| 6,349,132 B1 * | 2/2002 | Wesemann et al. ...... 379/88.17 |
| 6,385,583 B1 * | 5/2002 | Ladd et al. .................. 704/270 |

OTHER PUBLICATIONS

Wong, W., Dialing into Computer telephony, Network VAR, Mar. 1998, vol. 6, pp. 34–39, see p. 36.
Nava Air Federal Credit Union Call 24 Voice Response Brochure, May 1994, pp. 1–2, see p. 2.

* cited by examiner

Primary Examiner—Susan McFadden
(74) Attorney, Agent, or Firm—Charles W. Bethards; Hisashi D. Watanabe

(57) ABSTRACT

The present invention relates to a markup language document stored on a computer-readable medium to provide interactive services and methods thereof. The markup language comprises a dialog element and a step element. The dialog element includes markup language elements in which each markup language element is identifiable by one or more markup tags. The step element is contained within the dialog element and defines a state within the dialog element. The step element includes a prompt element, an input element, and a first attribute. The prompt element includes an announcement to be read to the user, and the input element includes an attribute to allow an audible user input to be converted to a text string.

51 Claims, 10 Drawing Sheets

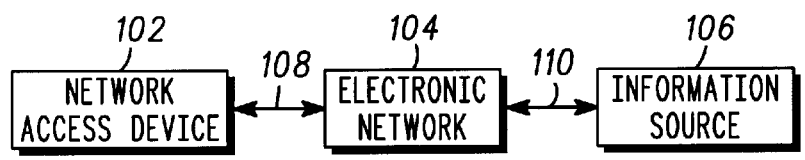
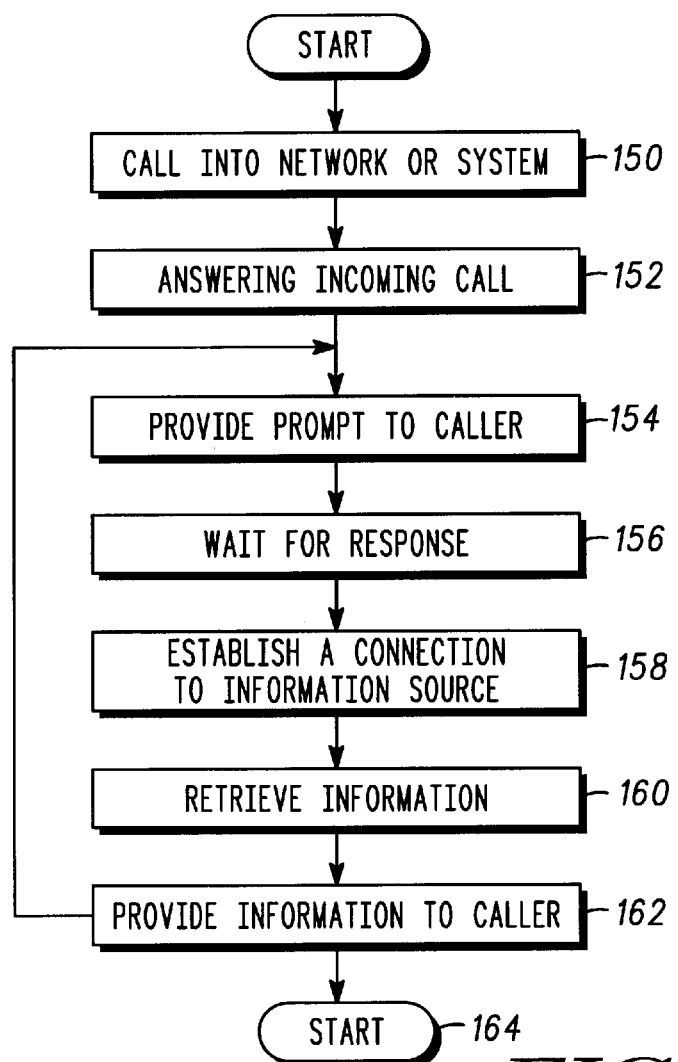

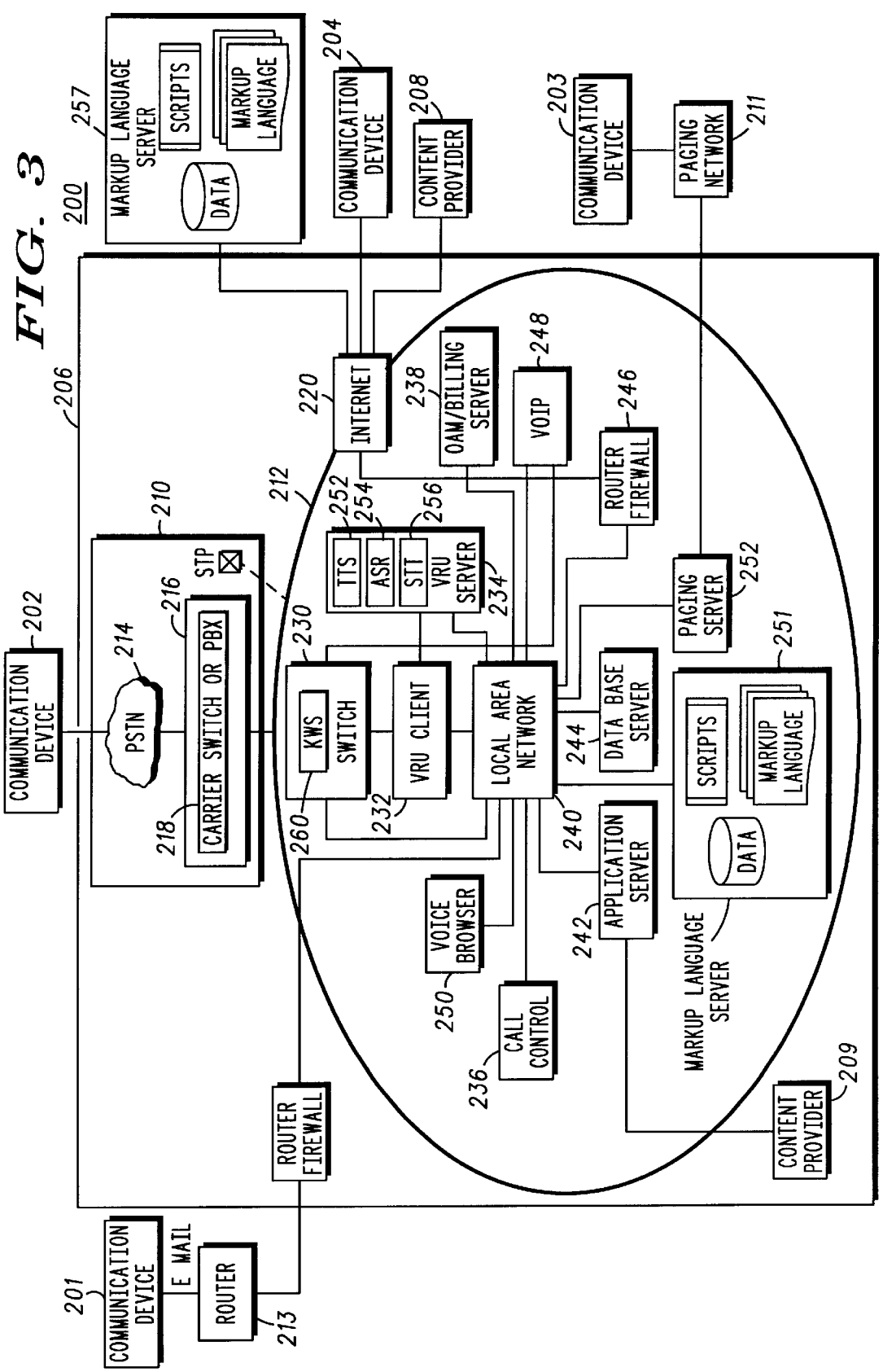

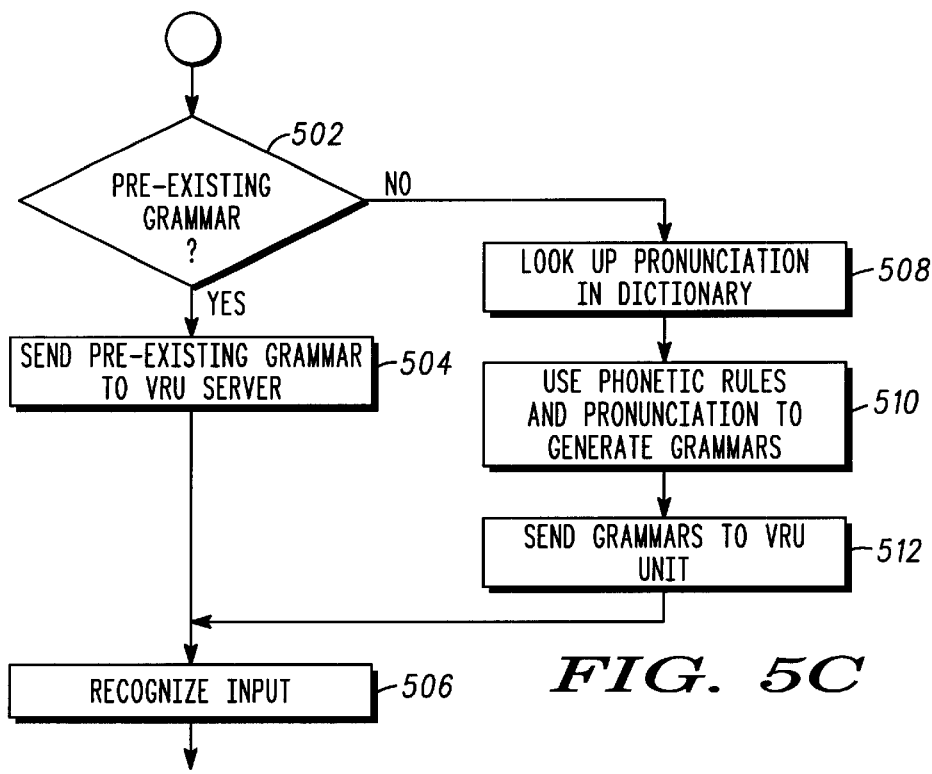

FIG. 5C

```
1   <? XML VERSION="1.0"?>
2   <DIALOG>
3       <STEP NAME="INIT">
4           <PROMPT>WHAT MEAL WOULD LIKE TO HEAR THE SPECIALS
5   FOR?</PROMPT>
6           <INPUT TYPE="OPTIONLIST">
7               <OPTION NEXT="#BKFST"> BREAKFAST </OPTION>
8               <OPTION NEXT="#LUNCH"> LUNCH </OPTION>
9               <OPTION NEXT="#DINNER"> DINNER </OPTION>
10          </INPUT>
11      </STEP>
12
13      <STEP NAME="BKFST">
14          <PROMPT> OUR BREAKFAST SPECIAL IS GREEN EGGS AND HAM </PROMPT>
15      </STEP>
16
17      <STEP NAME="LUNCH">
18          <PROMPT> OUR LUNCH SPECIAL IS A BACON, LETTUCE, AND TOMATO
19  SANDWICH. </PROMPT>
20      </STEP>
21
22      <STEP NAME="DINNER">
23          <PROMPT> OUR DINNER SPECIAL TODAY IS ROAST BEEF AND MASHED
24  POTATOES. </PROMPT>
25      </STEP>
26  </DIALOG>
```

FIG. 6

```
<STEP NAME="order form">
    <PROMPT> What you like to order? </PROMPT>
    <INPUT TYPE="form" NAME="order" NEXT="#next order" METHOD="post" ACTION="http://www.test.com/cgi-bin/post-query" TIMEOUT="200" />
</STEP>
```

*FIG. 10*

MARKUP LANGUAGE FOR INTERACTIVE SERVICES AND METHODS THEREOF

The present application is a continuation of U.S. application Ser. No. 09/165,487 filed on Oct. 2, 1998. which is based on prior U.S. application Ser. Nos. 60/094,131 and 60/094,032, filed on Jul. 24, 1998 which are hereby incorporated by reference, and priority thereto for common subject matter is hereby claimed.

FIELD OF THE INVENTION

The present invention generally relates to information retrieval, and more particularity, to methods and systems to allow a user to access information from an information source.

BACKGROUND OF THE INVENTION

On-line electronic information services are being increasingly utilized by individuals having personal computers to retrieve various types of information. Typically, a user having a personal computer equipped with a modem dials into a service provider, such as an Internet gateway, an on-line service (such an America On-line, CompuServer, or Prodigy), or an electronic bulletin board to download data representative of the information desired by the user.

The information from the service provider is typically downloaded in real-time (i.e., the information is downloaded contemporaneously with a request for the information). Examples of information downloaded in this manner include electronic versions of newspapers, books (i.e., an encyclopedia), articles, financial information, etc. The information can include both text and graphical in any of these examples.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 1 is a block diagram of an embodiment of a system in accordance with the present invention;

FIG. 2 is a flow diagram of a method of retrieving information from an information source;

FIG. 3 is an exemplary block diagram of another embodiment of a system in accordance with the present invention;

FIGS. 5a–5c are flow diagrams of a routine carried out by the voice browser of FIG. 4;

FIG. 6 is an exemplary markup language document;

FIG. 10 is an exemplary attribute of a markup language document that allows an audible user input to be converted to a text string.

Figure 4:
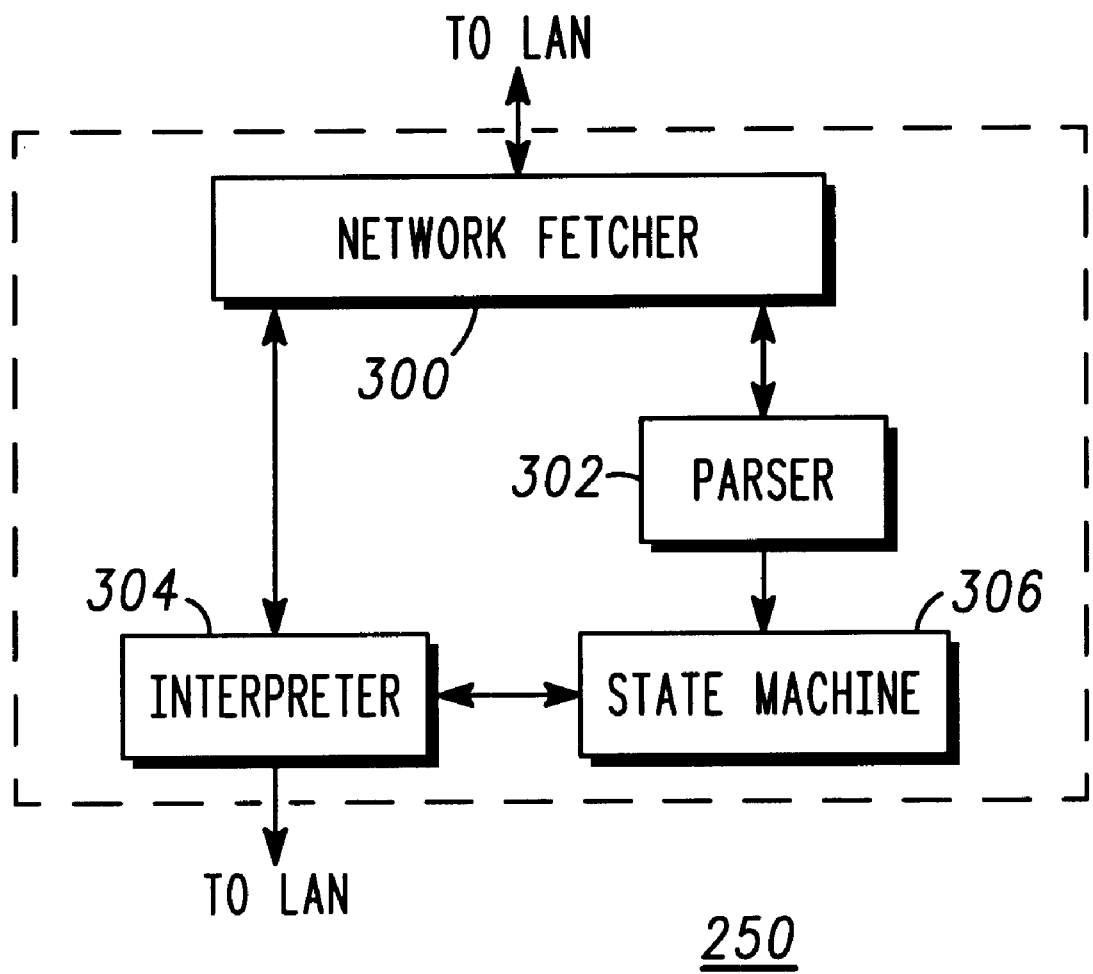
FIG. 4 is a block diagram of a voice browser of the system of FIG. 3.

The following is an example, also shown in FIG. 10, of the user of the FORM input in a markup language document.

DETAILED DESCRIPTION OF THE PREFERRED EMBODIMENTS

Before explaining the present embodiments in detail, it should be understood that the invention is not limited in its application or use to the details of construction and arrangement of parts illustrated in the accompanying drawings and description. It will be recognized that the illustrative embodiments of the invention may be implemented or incorporated in other embodiments, variations and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limitation.

Referring now to the drawings, and more particularly to FIG. 1, a block diagram of a system 100 is illustrated to enable a user to access information. The system 100 generally includes one or more network access apparatus 102 (one being shown), an electronic network 104, and one or more information sources or content providers 106 (one being shown).

The electronic network 104 is connected to the network access apparatus 102 via a line 108, and the electronic network 102 is connected to the information source 106 via a line 110. The lines 108 and 110 can include, but are not limited to, a telephone line or link, an ISDN line, a coaxail line, a cable television line, a fiber optic line, a computer network line, a digital subscriber line, or the like. Alternatively, the network access apparatus 102 and the information source 106 can wirelessly communicate with the electronic network. For example, the electronic network 104 can provide information to the network access apparatus 102 by a satellite communication system, a wireline communication system, or a wireless communication system.

The system 100 enables users to access information from any location in the world via any suitable network access device. The users can include, but are not limited to, cellular subscribers, wireline subscribers, paging subscribers, satellite subscribers, mobile or portable phone subscribers, trunked radio subscribers, computer network subscribers (i.e., internet subscribers, intranet subscribers, etc.), branch office users, and the like.

The users can preferably access information from the information source 106 using voice inputs or commands. For example, the users can access up-to-date information, such as, news updates, designated city weather, traffic conditions, stock quotes, calendar information, user information, address information, and stock market indicators. The system also allows the users to perform various transactions (i.e., order flowers, place orders from restaurants, place buy and sell stock orders, obtain bank account balances, obtain telephone numbers, receive directions to various destinations, etc.).

As shown in FIG. 1, a user utilizes the network access apparatus 102 of the system 100 to communicate and/or connect with the electronic network 104. The electronic network 104 retrieves information from the information source 106 based upon speech commands or DTMF tones from the user. The information is preferably stored in a database or storage device (not shown) of the information source 106. The information source 106 can include one or more server computers (not shown). The information source can be integrated into the electronic network 104 or can be remote from the electronic network (i.e., at a content providers facilities). It will also be recognized that the network access apparatus 102, the electronic network 104, and the information source 106 can be integrated in a single system or device.

The information of the information source 106 can be accessed over any suitable communication medium. The information source 106 can be identified by an electronic address using at least a portion of a URL (Uniform Resource Locator), a URN (Uniform Resource Name), an IP (Internet Protocol) address, an electronic mail address, a device address (i.e. a pager number), a direct point to point connection, a memory address, etc. It is noted that a URL can include: a protocol, a domain name, a path, and a filename. URL protocols include: "file:" for accessing a file stored on a local storage medium; "ftp:" for accessing a file from an FTP (file transfer protocol) server; "http:" for accessing an HTML (hypertext marking language) document; "gopher:" for accessing a Gopher server; "mailto:" for sending an e-mail message; "news:" for linking to a Usenet newsgroup; "telnet:" for opening a telnet session; and "wais:" for accessing a WAIS server.

Once the electronic network 104 of the system 100 receives the information from the information source 106, the electronic network sends the information to the network access apparatus 102. The electronic network 104 can include an open, wide area network such as the Internet, the World Wide Web (WWW), and/or an on-line service. The electronic network 104 can also include, but is not limited to, an intranet, an extranet, a local area network, a telephone network, (i.e., a public switched telephone network), a cellular telephone network, a personal communication system (PCS) network, a television network (i.e., a cable television system), a paging network (i.e., a local paging network), a regional paging network, a national or a global paging network, an email system, a wireless data network (i.e., a satellite data network or a local wireless data network), and/or a telecommunication node.

The network access apparatus 102 of the system 100 allows the user to access (i.e., view and/or hear) the information retrieved from the information source. The network access apparatus can provided the information to the user as machine readable data, human readable data, audio or speech communications, textual information, graphical or image data, etc. The network access apparatus can have a variety of forms, including but not limited to, a telephone, a mobile phone, an office phone, a home phone, a pay phone, a paging unit, a radio unit, a web phone, a personal information manager (PIM), a personal digital assistant (PDA), a general purpose computer, a network television, an Internet television, an Internet telephone, a portable wireless device, a workstation, or any other suitable communication device. It is contemplated that the network access device can be integrated with the electronic network. For example, the network access device, the electronic network, and/or the information source can reside in a personal computer.

The network access apparatus 102 may also include a voice or web browser, such as, a Netscape Navigator® web browser, a Microsoft Internet Explorer® web browser, a Mosaic® web browser, etc. It is also contemplated that the network access apparatus 102 can include an optical scanner or bar code reader to read machine readable data, magnetic data, optical data, or the like, and transmit the data to the electronic network 104. For example, the network access apparatus could read or scan a bar code and then provide the scanned data to the electronic network 104 to access the information from the information source (i.e., a menu of a restaurant, banking information, a web page, weather information, etc.).

FIG. 2 illustrates a flow diagram of a method of retrieving information from a destination or database of the information source 106. At block 150, a user calls into the electronic network 104 from a network access apparatus. After the electronic network answers the incoming calls at block 152, the electronic network can attempt to verify that the user is a subscriber of the system and/or the type of network access apparatus the user is calling from. For example, the system may read and decode the automatic number identification (ANI) or caller line identification (CLI) of the call and then determine whether the CLI of the call is found in a stored ANI or CLI list of subscribers. The system may also identify the user by detecting a unique speech pattern from the user (i.e., speaker verification) or a PIN entered using voice commands or DTMF tones.

After the electronic network answers the call, the electronic network provides a prompt or announcement to the caller at block 154 (i.e., "Hi. This is your personal agent. How may I help you"). The electronic network can also set grammars (i.e., vocabulary) and personalities (i.e., male or female voices) for the call. The electronic network can load the grammars and personalities based upon the CLI, the network access apparatus, or the identity of the user. For example, the grammars and personalities can be set or loaded depending upon the type of device (i.e., a wireless phone), the gender of the caller (i.e., male or female), the type of language (i.e., English, Spanish, etc.), and the accent of the caller (i.e., a New York accent, a southern accent, an English accent, etc.). It is also contemplated that the personalities and grammars may be changed by the user or changed by the electronic network based upon the speech communications detected by the electronic network.

At block 156, the electronic network waits for an input or command from the user that corresponds to a destination of the information source desired by the user. The input can be audio commands (i.e., speech) or DTMF tones. After the electronic network receives the input from the user, the electronic network establishes a connection or a link to the information source at block 158. The electronic network preferably determines an electronic address of the information source (i.e., URL, a URN, an IP address, or an electronic mail address) based upon the inputs from the user (i.e., speech or DTMF tones). The electronic address can be retrieved from a database using a look-up operation based upon at least a portion of the input.

At block 160, the electronic network retrieves at least a portion of the information from the destination of the information source at block 160. The electronic network processes the information and then provides an output to the user based upon the retrieved information at block 162. The output can include a speech communication, textual information, and/or graphical information. For example, the electronic network can provide a speech communication using speech-to-text technology or human recorded speech. The process then proceeds to block 164 or block 154 as described above. It will be recognized that the above described method can be carried out by a computer.

Referring now to FIG. 3, an exemplary block diagram of an embodiment of a system 200 to enable a user to access information is shown. The system 200 enables a user to access information from any location in the world via a suitable communication device. The system 200 can provide access to yellow pages, directions, traffic, addresses, movies, concerts, airline information, weather information, new reports, financial information, flowers, personal data, calendar data, address data, gifts, books, etc. The user can also perform a series of transactions without having to terminate the original call to the system. For example, the user can access a news update and obtain weather information, all without having to dial additional numbers or terminate the original call. The system 200 also enables application developers to build applications for interactive speech applications using a markup language, such as VoxML™ voice markup language developed by Motorola, Inc.

The system 200 generally includes one or more communication devices or network access apparatus 201, 202, 203 and 204 (four being shown), an electronic network 206, and one or more information sources, such as content providers 208 and 209 (two being shown) and markup language servers. The user can retrieve the information from the information sources using speech commands or DTMF tones.

The user can access the electronic network 206 by dialing a single direct access telephone number (i.e., a foreign exchange number, a local number, or a toll-free number or PBX) from the communication device 202. The user can also access the electronic network 206 from the communication device 204 via the internet, from the communication device 203 via a paging network 211, and from the communication device 201 via a local area network (LAN), a wide area network (WAN), or an email connection.

The communication devices can include, but are not limited to, landline or wireline devices (i.e., home phones, work phones, computers, facsimile machines, pay phones), wireless devices (i.e., mobile phones, trunked radios, handheld devices, PIMs, PDAs, etc.), network access devices (i.e. computers), pagers, etc. The communication devices can include a microphone, a speaker, and/or a display.

As shown in FIG. 3, the electronic network 206 of the system 200 includes a telecommunication network 210 and a communication node 212. The telecommunication network 210 is preferably connected to the communication node 212 via a high-speed data link, such as, a T1 telephone line, a local area network (LAN), or a wide area network (WAN). The telecommunication network 210 preferably includes a public switched network (PSTN) 214 and a carrier network 216. The telecommunication network 210 can also include international or local exchange networks, cable television network, interexchange carrier networks (IXC) or long distance carrier networks, cellular networks (i.e., mobile switching centers (MSC)), PBXs, satellite systems, and other switching centers such as conventional or trunked radio systems (not shown), etc.

The PSTN 214 of the telecommunication network 210 can include various types of communication equipment or apparatus, such as ATM networks, Fiber Distributed data networks (FDDI), T1 lines, cable television networks and the like. The carrier network 216 of the telecommunication network 210 generally includes a telephone switching system or central office 218. It will be recognized that the carrier network 216 can be any suitable system that can route calls to the communication node 212, and the telephone switching system 218 can be any suitable wireline or wireless switching system.

The communication node 212 the system 200 is preferably configured to receive and process incoming calls from the carrier network 216 and the internet 220, such as the WWW. The communication node can receive and process pages from the paging network 211 and can also receive and process messages (i.e., emails) from the LAN, WAN or email connection 213.

When a user dials into the electronic network 206 from the communication device 202, the carrier network 216 routes the incoming call from the PSTN 214 to the communication node 212 over one or more telephone lines or trunks. The incoming calls preferably enters the carrier network 216 through one or more "888"[ or "800" INWATS trunk lines, local exchange trunk lines, or long distance trunk lines. It is also contemplated that the incoming calls can be received from a cable network, a cellular system, or any other suitable system.

The communication node 212 answers the incoming call from the carrier network 216 and retrieves an appropriate announcement (i.e., a welcome greeting) from a database, server, or browser. The node 212 then plays the announcement to the caller. In response to audio inputs from the user, the communication node 212 retrieves information from a destination or database of one or more of the information sources, such as the content providers 208 and 209 or the markup language servers. After the communication node 212 receives the information, the communication node provides a response to the user based upon the retrieved information.

The node 212 can provide various dialog voice personalities (i.e., a female voice, a male voice, etc.) and can implement various grammars (i.e., vocabulary) to detect and respond to the audio inputs from the user. In addition, the communication node can automatically select various speech recognition models (i.e., an English model, a Spanish model, an English accent model, etc.) based upon a user profile, the user's communication device, and/or the user's speech patterns. The communication node 212 can also allow the user to select a particular speech recognition model.

When a user accesses the electronic network 206 from a communication device registered with the system (i.e., a user's home phone, work phone, cellular phone, etc.), the communication node 212 can by-pass a user screening option and automatically identify the user (or the type of the user's communication device) through the use of automatic number identification (ANI) or caller line identification (CLI). After the communication node verifies the call, the node provides a greeting to the user (i.e., "Hi, this is your personal agent, Maya. Welcome Bob. How may I help you?"). The communication node then enters into a dialogue with the user, and the user can select a variety of information offered by the communication node.

When the user accesses the electronic network 206 from a communication device not registered with the system (i.e., a payphone, a phone of a non-subscriber, etc.), the node answers the call and prompts the user to enter his or her name and/or a personal identification number (PIN) using speech commands or DTMF tones. The node can also utilize speaker verification to identify a particular speech pattern of the user. If the node authorizes the user to access the system, the node provides a personal greeting to the user (i.e., "Hi, this is your personal agent, Maya. Welcome Ann. How may I help you?"). The node then enters into a dialogue with the user, and the user can select various information offered by the node. If the name and/or PIN of the user cannot be recognized or verified by the node, the user will be routed to a customer service representative.

As shown in FIG. 3, the communication node 212 preferably includes a telephone switch 230, a voice or audio recognition (VRU) client 232, a voice recognition (VRU) server 234, a controller or call control unit 236, an Operation and Maintenance Office (OAM) or a billing server unit 238, a local area network (LAN) 240, an application server unit 242, a database server unit 244, a gateway server or router firewall server 246, a voice over internet protocol (VOIP) unit 248, a voice browser 250, a markup language server 251, and a paging server 252. Although the communication node 206 is shown as being constructed with various types of independent and separate units or devices, the communication node 212 can be implemented by one or more integrated circuits, microprocessors, microcontrollers, or computers which may be programmed to execute the operations or functions equivalent to those performed by the device or units shown. It will also be recognized that the communication node 212 can be carried out in the form of hardware components and circuit designs, software or computer programming, or a combination thereof.

The communication node 212 can be located in various geographic locations throughout the world or the United States (i.e., Chicago, Ill.). The communication node 212 can be operated by one or more carriers (i.e., Sprint PCS, Qwest Communications, MCI, etc.) or independent service providers, such as, for example, Motorola, Inc.

The communication node 212 can be co-located or integrated with the carrier network 216 (i.e., an integral part of the network) or can be located at a remote site from the carrier network 216. It is also contemplated that the communication node 212 may be integrated into a communication device, such as, a wireline or wireless phone, a radio device, a personal computer, a PDA, a PIM, etc. In this arrangement, the communication device can be programmed to connect or link directly into an information source.

The communication node 212 can also be configured as a standalone system to allow users to dial directly into the communication node via a toll free number or a direct access number. In addition, the communication node 212 may comprise a telephony switch (i.e., a PBX or Centrix unit), an enterprise network, or a local area network. In this configuration, the system 200 can be implemented to automatically connect a user to the communication node 212 when the user picks a communication device, such as, the phone.

When the telephone switch 230 of the communication node 212 receives an incoming call from the carrier network 216, the call control unit 236 sets up a connection in the switch 230 to the VRU client 232. The communication node 212 then enters into a dialog with the user regarding various services and functions. The VRU client 232 preferably generates pre-recorded voice announcements and/or messages to prompt the user to provide inputs to the communication node using speech commands or DTMF tones. In response to the inputs from the user, the node 212 retrieves information from a destination of one of the information sources and provides outputs to the user based upon the information.

The telephone switch 230 of the telecommunication node 212 is preferably connected to the VRU client 232, the VOIP unit 248, and the LAN 240. The telephone switch 230 receives incoming calls from the carrier switch 216. The telephone switch 230 also receives incoming calls from the communication device 204 routed over the internet 220 via the VOIP unit 248. The switch 230 also receives messages and pages from the communication devices 201 and 203, respectively. The telephone switch 230 is preferably a digital cross-connect switch, Model No. LNX, available from Excel Switching Corporation, 255 Independence Drive, Hyannis, Mass. 02601. It will be recognized that the telephone switch 230 can be any suitable telephone switch.

The VRU client 232 of the communication node 212 is preferably connected to the VRU server 234 and the LAN 240. The VRU client 232 processes speech communications, DTMF tones, pages, and messages (i.e., emails) from the user. Upon receiving speech communications from the user, the VRU client 232 routes the speech communications to the VRU server 234. When the VRU client 232 detects DTMF tones, the VRU client 232 sends a command to the call control unit 236. it will be recognized that the VRU client 232 can be integrated with the VRU server.

The VRU client 232 preferably comprises a computer, such as, a Windows NT compatible computer with hardware capable of connecting individual telephone lines directly to the switch 230. The VRU client preferably includes a microprocessor, random access memory, read-only memory, a T1 or ISDN interface board, and one or more voice communication processing board (not shown). The voice communication processing boards of the VRU client 232 are preferably Dialogic boards, Model No. Antares, available from Dialogic Corporation, 1515 Route 10, Parsippany, N.J. 07054. The voice communication boards may include a voice recognition engine having a vocabulary for detecting a speech pattern (i.e., a key word or phrase). The voice recognition engine is preferably a RecServer software package, available from Nuance Communications, 1380 Willow Road, Menlo Park, Calif. 94025.

The VRU client 232 can also include an echo canceler (not shown) to reduce or cancel text-to-speech or playback echoes transmitted from the PSTN 214 due to hybrid impedance mismatches. The echo canceler is preferably included in an Antares Board Support Package, available from Dialogic.

The call control unit 236 of the communication node 212 is preferably connected to the LAN 240. The call control unit 236 sets up the telephone switch 230 to connect incoming calls to the VRU client 232. The call control unit also sets up incoming calls or pages into the node 212 over the internet 220 and pages and messages sent from the communication devices 201 and 203 via the paging network 203 and email system 213. The control call unit 236 preferably comprises a computer, such as, a Window NT compatible computer.

The LAN 240 of the communication node 212 allows the various components and devices of the node 212 to communicate with each other via a twisted pair, a fiber optic cable, a coaxial cable, or the like. The LAN 240 may use Ethernet, Token Ring, or other suitable types of protocols. The LAN 240 is preferably a 100 Megabit per second Ethernet switch, available from Cisco Systems, San Jose, Calif. It will be recognized that the LAN 240 can comprise any suitable network system, and the communication node 212 may include a plurality of LANS.

The VRU server 234 of the communication node 212 is connected to the VRU client 232 and the LAN 240. The VRU server 234 receives speech communications from the user via the VRU client 232. The VRU server 234 processes the speech communications and compares the speech communications against a vocabulary or grammar stored in the database server unit 244 or a memory device. The VRU server 234 provides output signals, representing the result of the speech processing, to the LAN 240. The LAN 240 routes the output signal to the call control unit 236, the application server 242, and/or the voice browser 250. The communication node 212 then performs a specific function associated with the output signals.

The VRU server 234 preferably includes a text-to-speech (TTS) unit 252, an automatic speech recognition (ASR) unit 254, and a speech-to-text (STT) unit 256. The TTS unit 252 of the VRU server 234 receives textual data or information (i.e., e-mail, web pages, documents, files, etc.) from the application server unit 242, the database server unit 244, the call control unit 236, the gateway server 246, the application server 242, and the voice browser 250. The TTS unit 252 processes the textual data and converts the data to voice data or information.

The TTS unit 252 can provide data to the VRU client 232 which reads or plays the data to the user. For example, when the user requests information (i.e., news updates, stock information, traffic conditions, etc.), the communication node 212 retrieves the desired data (i.e., textual information) from a destination of the one or more of the information sources and converts the data via the TTS unit 252 into a response.

The response is then sent to the VRU client 232. The VRU client processes the response and reads an audio message to the user based upon the response. It is contemplated that the VRU server 234 can read the audio message to the user using human recorded speech or synthesized speech. The TTS unit 252 is preferably a TTS 2000 software package, available from Lernout and Hauspie Speech Product NV, 52 Third Avenue, Burlington, Mass. 01803.

The ASR unit 254 of the VRU server 234 provides speaker independent automatic speech recognition of speech inputs or communications from the user. It is contemplated that the ASR unit 254 can include speaker dependent speech recognition. The ASR unit 254 processes the speech inputs from the user to determine whether a word or a speech pattern matches any of the grammars or vocabulary stored in the database server unit 244 or downloaded from the voice browser. When the ASR unit 254 identifies a selected speech pattern of the speech inputs, the ASR unit 254 sends an output signal to implement the specific function associated with the recognized voice pattern. The ASR unit 254 is preferably a speaker independent speech recognition software package, Model No. RecServer, available from Nuance Communications. It is contemplated that the ASR unit 254 can be any suitable speech recognition unit to detect voice communications from a user.

The STT unit 256 of the VRU server 234 receives speech inputs or communications from the user and converts the speech inputs to textual information (i.e., a text message). The textual information can be sent or routed to the communication devices 201, 202, 203 and 204, the content providers 208 and 209, the markup language servers, the voice browser, and the application server 242. The STT unit 256 is preferably a Naturally Speaking software package, available from Dragon Systems, 320 Nevada Street, Newton, Mass. 02160-9803.

The VOIP unit 248 of the telecommunication node 212 is preferably connected to the telephone switch 230 and the LAN 240. The VOIP unit 248 allows a user to access the node 212 via the internet 220 using voice commands. The VOIP unit 240 can receive VOIP protocols (i.e., H. 323 protocols) transmitted over the internet 220 and can convert the VOIP protocols to speech information or data. The speech information can then be read to the user via the VRU client 232. The VOIP unit 248 can also receive speech inputs or communications from the user and convert the speech inputs to a VOIP protocol that can be transmitted over the internet 220. The VOIP unit 248 is preferably a Voice Net software package, available from Dialogic Corporation. It will be recognized that the VOIP device can be incorporated into a communication device.

The telecommunication node 212 also includes a detection unit 260. The detection unit 260 is preferably a phrase or key word spotter unit to detect incoming audio inputs or communications or DTMF tones from the user. The detector unit 260 is preferably incorporated into the switch 230, but can be incorporated into the VRU client 232, the carrier switch 216, or the VRU server 256. The detection unit 260 is preferably included in a RecServer software package, available from Nuance Communications.

The detection unit 260 records the audio inputs from the user and compares the audio inputs to the vocabulary or grammar stored in the database server unit 244. The detector unit continuously monitors the user's audio inputs for a key phase or word after the user is connected to the node 212. When the key phrase or word is detected by the detection unit 260, the VRU client 232 plays a pre-recorded message to the user. The VRU client 232 then responds to the audio inputs provided by the user.

The billing server unit 238 of the communication node 212 is preferably connected to the LAN 240. The billing server unit 238 can record data about the use of the communication node by a user (i.e., length of calls, features accessed by the user, etc.). Upon completion of a call by a user, the call control unit 236 sends data to the billing server unit 238. The data can be subsequently processed by the billing server unit in order to prepare customer bills. The billing server unit 238 can use the ANI or CLI of the communication device to properly bill the user. The billing server unit 238 preferably comprises a Windows NT compatible computer.

The gateway server unit 246 of the communication node 212 is preferably connected to the LAN 240 and the internet 220. The gateway server unit 246 provides access to the content provider 208 and the markup language server 257 via the internet 220. The gateway unit 246 also allows users to access the communication node 212 from the communication device 204 via the internet 220. The gateway unit 246 can further function as a firewall to control access to the communication node 212 to authorized users. The gateway unit 246 is preferably a Cisco Router, available from Cisco Systems.

The database server unit 244 of the communication node 212 is preferably connected to the LAN 240. The database server unit 244 preferably includes a plurality of storage areas to store data relating to users, speech vocabularies, dialogs, personalities, user entered data, and other information. Preferably, the database server unit 244 stores a personal file or address book. The personal address book can contain information required for the operation of the system, including user reference numbers, personal access codes, personal account information, contact's addresses, and phone numbers, etc. The database server unit 244 is preferably a computer, such as an NT Window compatible computer.

The application server 242 of the communication node 212 is preferably connected to the LAN 240 and the content provider 209. The application server 242 allows the communication node 212 to access information from a destination of the information sources, such as the content providers and markup language servers. For example, the application server can retrieve information (i.e., weather reports, stock information, traffic reports, restaurants, flower shops, banks, etc.) from a destination of the information sources. The application server 242 processes the retrieved information and provides the information to the VRU server 234 and the voice browser 250. The VRU server 234 can provide an audio announcement to the user based upon the information using text-to-speech synthesizing or human recorded voice.

The application server 242 can also send tasks or requests (i.e., transactional information) received from the user to the information sources (i.e., a request to place an order for a pizza). The application server 242 can further receive user inputs from the VRU server 234 based upon a speech recognition output. The application server is preferably a computer, such as an NT Windows compatible computer.

The markup language server 251 of the communication node 212 is preferably connected to the LAN 240. The markup language server 251 can include a database, scripts, and markup language documents or pages. The markup language server 251 is preferably a computer, such as an NT Window Compatible Computer. It will also be recognized that the markup language server 251 can be an internet server (i.e., a Sun Microsystems server).

The paging server 252 of the communication node 212 is preferably connected to the LAN 240 and the paging network 211. The paging server 252 routes pages between the LAN 240 and the paging network. The paging server 252 is preferably a computer, such as a NT compatible computer.

The voice browser 250 of the system 200 is preferably connected to the LAN 240. The voice browser 250 preferably receives information from the information sources, such as the content provider 209 via the application server 242, the markup language servers 251 and 257, the database 244, and the content provider 208. In response to voice inputs from the user or DTMF tones, the voice browser 250 generates a content request (i.e., an electronic address) to navigate to a destination of one or more of the information sources. The content request can use at least a portion of a URL, a URN, an IP, a page request, or an electronic email.

After the voice browser is connected to an information source, the voice browser preferably uses a TCP/IP connect to pass requests to the information source. The information source responds to the requests, sending at least a portion of the requested information, represented in electronic form, to the voice browser. The information can be stored in a database of the information source and can include text content, markup language document or pages, non-text content, dialogs, audio sample data, recognition grammars, etc. The voice browser then parses and interprets the information as further described below. It will be recognized that the voice browser can be integrated into the communication devices 201, 202, 203, and 204.

As shown in FIG. 3, the content provider 209 is connected to the application server 244 of the communication node 212, and the content provider 208 is connected to the gateway server 246 of the communication node 212 via the internet 220. The content providers can store various content information, such as news, weather, traffic conditions, etc. The content providers 208 and 209 can include a server to operate web pages or documents in the form of a markup language. The content providers 208 and 209 can also include a database, scripts, and/or markup language documents or pages. The scripts can include images, audio, grammars, computer programs, etc. The content providers execute suitable server software to send requested information to the voice browser.

Referring now to FIG. 4, a block diagram of the voice browser 250 of the communication node 212 is illustrated. The voice browser 250 generally includes a network fetcher unit 300, a parser unit 302, an interpreter unit 304, and a state machine unit 306. Although the voice browser is shown as being constructed with various types of independent and separate units or devices, it will be recognized that the voice browser 250 can be carried out in the form of hardware components and circuit designs, software or computer programming, or a combination thereof.

The network fetcher 300 of the voice browser 250 is connected to the parser 302 and the interpreter 304. The network fetcher 300 is also connected to the LAN 240 of the communication node 212. The network fetcher unit 304 retrieves information, including markup language documents, audio samples and grammars from the information sources.

Figure 7:
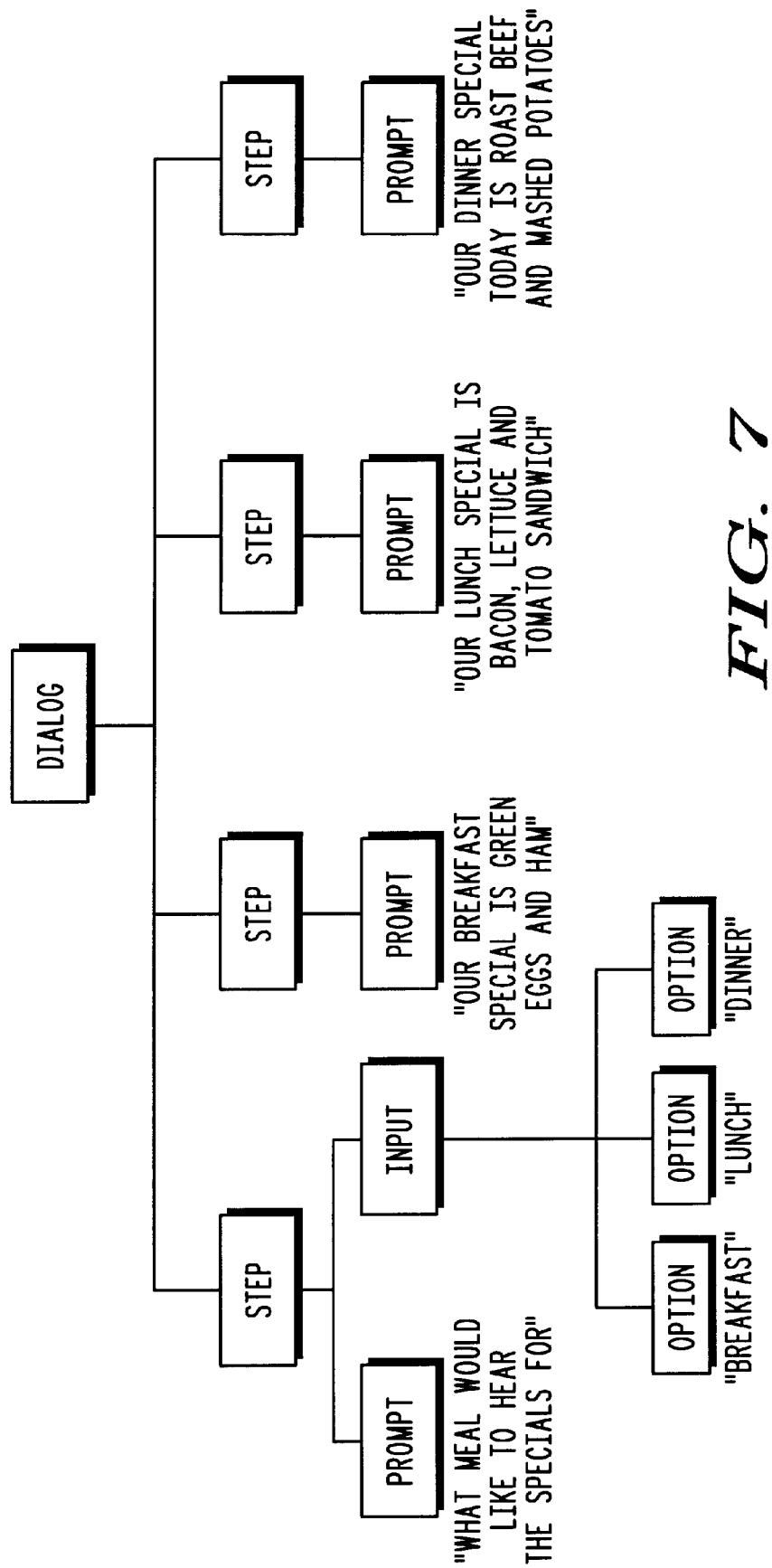
FIG. 7 is a diagrammatic illustration of a hierarchical structure of the markup language document of FIG. 6.

The parser unit 302 of the voice browser 250 is connected to the network fetcher unit 300 and the state machine unit 306. The parser unit 302 receives the information from the network fetcher unit 300 and parses the information according to the syntax rules of the markup language as further described below (i.e., extensible markup language syntax). The parser unit 302 generates a tree or heirarchial structure representing the markup language that is stored in memory of the state machine unit 306. A tree structure of an exemplary markup language document is shown in FIG. 7.

The following text defines the syntax and grammar that the parser unit of the voice browser utilizes to build a tree structure of the markup language document.

```
<!ELEMENT dialog (step|class)*>
<!ATTLIST dialog bargein (Y|N) "Y">
<!ELEMENT step (prompt|input|help|error|cancel|ack)*>
<!ATTLIST step name ID #REQUIRED
        parent IDREF #IMPLIED
        bargein (Y|N) "Y"
        cost CDATA #IMPLIED>
<!ELEMENT class (prompt|help|error|cancel|ack)*>
<!ATTLIST class name ID #REQUIRED
        parent IDREF #IMPLIED
        bargein (Y|N) "Y"
        cost CDATA #IMPLIED>
<!ELEMENT prompt
(#PCDATA|options|value|emp|break|pros|audio)*>
<!ELEMENT emp
(#PCDATA|options|value|emp|break|pros|audio)*>
    <!ATTLIST emp level (strong|moderate|none|reduced)
"moderate">
<!ELEMENT pros
(#PCDATA|options|value|emp|break|pros|audio)*>
    <!ATTLIST pros rate CDATA #IMPLIED
        vol CDATA #IMPLIED
        pitch CDATA #IMPLIED
        range CDATA #IMPLIED>
<!ELEMENT help
(#PCDATA|options|value|emp|break|pros|audio)*>
    <!ATTLIST help ordinal CDATA #IMPLIED
        reprompt (Y|N) "N"
        next CDATA #IMPLIED
        nextmethod (get|post) "get">
<!ELEMENT error
(#PCDATA|options|value|emp|break|pros|audio)*>
    <!(ATTLIST error type NMTOKENS "ALL"
        ordinal CDATA #IMPLIED
        reprompt (Y|N) "N"
        next CDATA #IMPLIED
        nextmethod (get|post) "get">
<!ELEMENT cancel
(#PCDATA|value|emp|break|pros|audio)*>
    <!ATTLIST cancel next CDATA #REQUIRED
        nextmethod (get|post) "get">
<!ELEMENT audio EMPTY>
<!ATTLIST audio src CDATA #REQUIRED>
<!ELEMENT ack
(#PCDATA|options|value|emp|break|pros|audio)*>
    <!ATTLIST ack confirm NMTOKEN "YORN"
        background (Y|N) "N"
        reprompt (Y|N) "N">
<!ELEMENT input
(option|response|rename|switch|case)*>
```

-continued

```
<!ATTLIST input type
(none|optionlist|record|grammar|profile|hidden|
     yorn|digits|number|time|date|money|phone) #REQUIRED
          name ID #IMPLIED
          next CDATA #IMPLIED
          nextmethod (get|post) "get"
          timeout CDATA #IMPLIED
          min CDATA #IMPLIED
          max CDATA #IMPLIED
          profname NMTOKEN #IMPLIED
          subtype NMTOKEN #IMPLIED
          src CDATA #IMPLIED
          value CDATA #IMPLIED
          msecs CDATA #IMPLIED
          storage (file|request) #REQUIRED
          format CDATA #IMPLIED>
<!ELEMENT switch (case|switch)*>
<!ATTLIST switch field NMTOKEN #REQUIRED>
<!ELEMENT response (switch)*>
<!ATTLIST response next CDATA #IMPLIED
          nextmethod (get|post) "get"
          fields NMTOKENS #REQUIRED>
<!ELEMENT rename EMPTY>
<!ATTLIST rename varname NMTOKEN #REQUIRED
          recname NMTOKEN #REQUIRED>
<!ELEMENT case EMPTY>
<!ATTLIST case value CDATA #REQUIRED
          next CDATA #REQUIRED
          nextmethod (get|post) "get">
<!ELEMENT value EMPTY>
<!ATTLIST value name NMTOKEN #REQUIRED>
<!ELEMENT break EMPTY>
<!ATTLIST break msecs CDATA #IMPLIED>
          size (none|small|medium|large)
"medium">
<!ELEMENT options EMPTY>
<!ELEMENT or EMPTY>
<!ELEMENT option (#PCDATA|value|or)*>
<!ATTLIST option value CDATA #IMPLIED
          next CDATA #IMPLIED
          nextmethod (get|post) "get">
```

Referring again to FIG. 4, the interpreter unit 304 of the voice browser 250 is connected to the state machine unit 306 and the network fetcher unit 300. The interpreter unit 304 is also connected to the LAN. The interpreter unit 304 carries out a dialog with the user based upon the tree structure representing a markup language document.

The interpreter unit sends data to the TTS 252. The interpreter unit 304 can also receive data based upon inputs from the user via a VRU server and can send outputs to the information source based upon the user inputs.

The interpreter unit 304 can transition from state to state (i.e., step to step) within a tree structure (i.e., a dialog) of a markup language document or can transition to a new tree structure within the same dialog or another dialog. The interpreter unit determines the next state or step based upon the structure of the dialog and the inputs from the user. When the interpreter unit transitions to a new dialog or page, the address of the new dialog or page is then sent to the network fetcher.

The state machine 306 of the voice browser 250 is connected to the parser unit 302 and the interpreter unit 304. The state machine 306 stores the tree structure of the markup language and maintains the current state or step that the voice browser is executing.

Figure 5A:
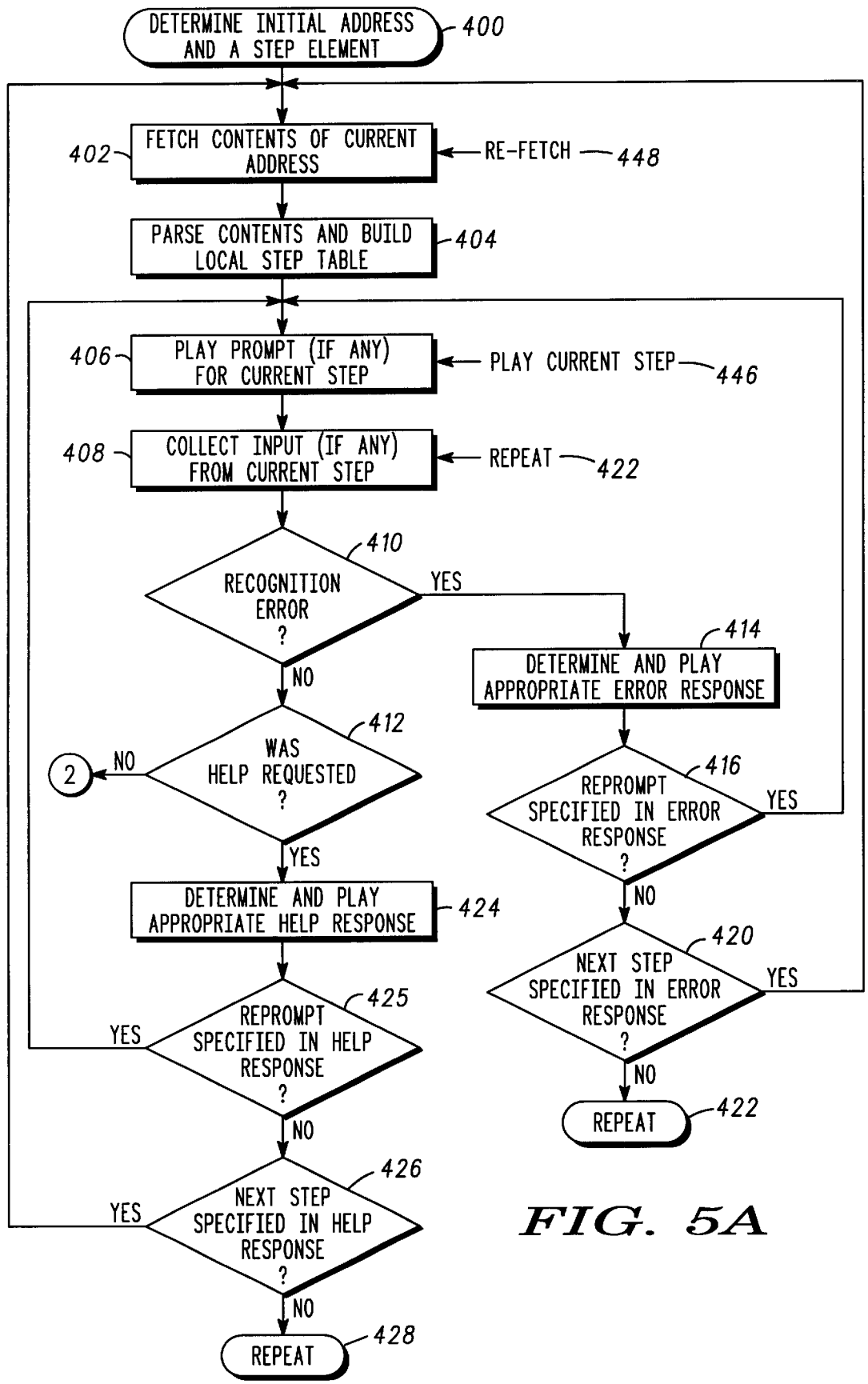
Figure 5B:
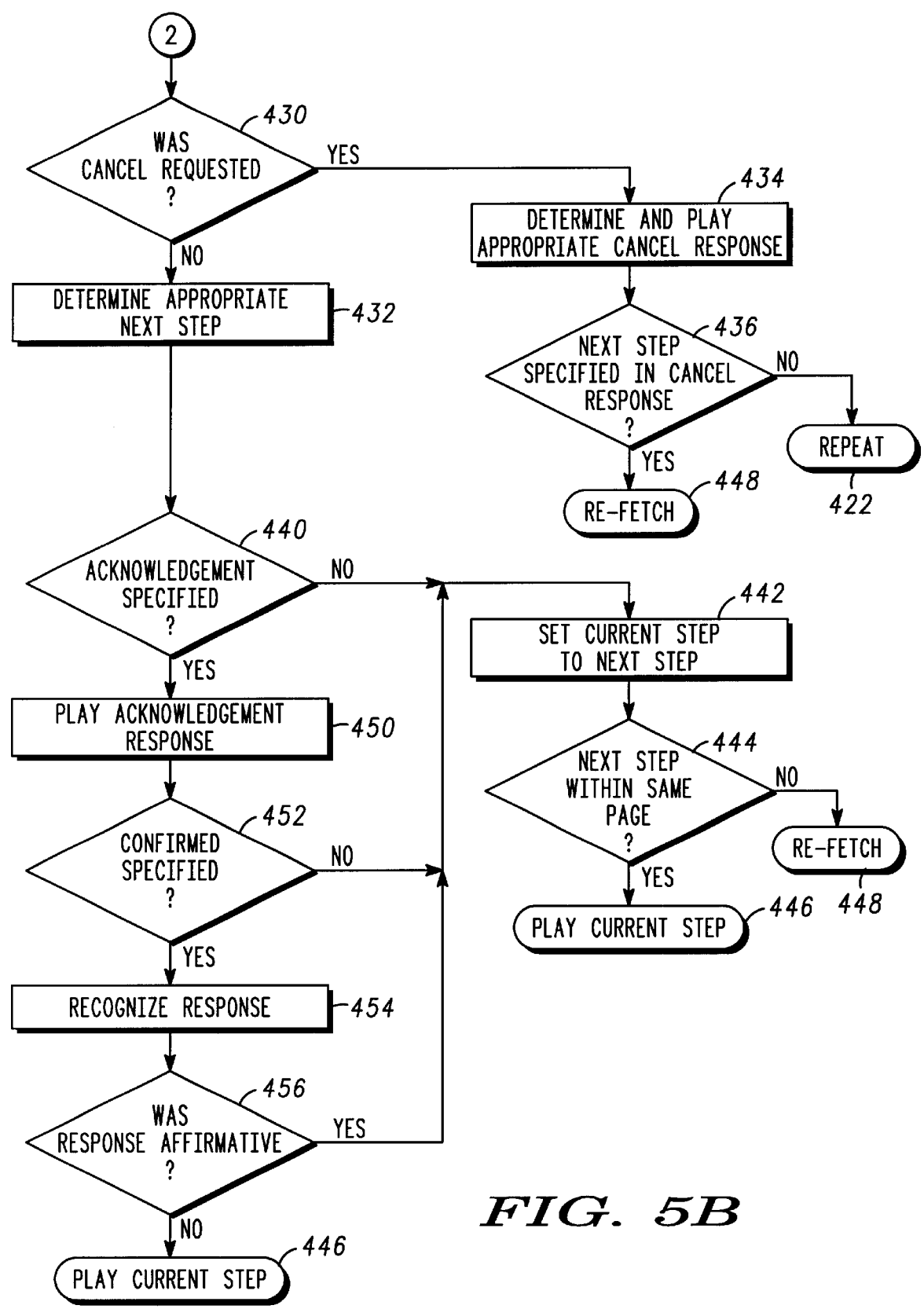

FIGS. 5a–5c illustrate a flow diagram of a software routine executed by the voice browser 250. The software routine allows interactive voice applications. At block 400, the voice browser 250 determines an initial address (i.e., a URL) and a step element or name. The voice browser then fetches the contents (i.e., a markup or language document) of the current address from the information sources (i.e., content providers and markup language servers) at block 402. After the voice browser fetches the address, the voice browser processes the contents and builds a local step table (i.e., a tree structure) at block 404.

At block 406, a prompt can be played to the user via the TTS unit of the system 200 for the current element.

The voice browser then waits for an input from the user (i.e., speech or DTMF tones). At block 408, the voice browser can collect input from the user for the current step element. FIG. 5c shows an exemplary flow diagram of a routine that is executed by the voice browser to determine the grammar for speech recognition.

At block 502, the voice browser determines whether a pre-determined grammar exists for the user input and the markup language. For example, the voice browser determines whether the grammar for the user input is found in a predetermined or pre-existing grammar stored in a database or contained in the markup language. If the grammar is found, the voice browser sends the grammar to the VRU server at block 504. At block 506, the VRU server compares the user input to the grammar to recognize the user input. After the VRU server recognizes the user input, the process proceeds to block 410 (see FIG. 5a) as described below.

If a pre-existing grammar is not found at block 502, the voice browser dynamically generates the grammar for the user input. At block 508, the voice browser looks up the pronunciations for the user in a dictionary at block 508. The dictionary can be stored in a database of the system or stored on an external database (i.e., the voice browser can fetch a dictionary from the processor or from the internet).

At block 510, the voice browser generates the grammar for the user inputs based upon the pronunciations from the dictionary and phonetic rules. A software routine available from Nuance Communication, Model No. RecServer, can be used to generate the grammar. At block 512, the grammar is sent to the VRU server. The voice browser then attempts to match the grammar to the user input at block 506.

After the voice browser detects or collects an input from the user at block 408, the voice browser determines whether there is an error at block 410. If the voice browser is having difficulty recognizing inputs from the user or detects a recognition error, a timeout error, etc., an appropriate error message is played to the user at block 414. For example, if the voice browser detected too much speech from the user or the recognition is too slow, a prompt is played (i.e., "Sorry, I didn't understand you") to the user via the VRU server. If the voice browser receives unexpected DTMF tones, a prompt is played (i.e., "I heard tones. Please speak your response") to the user via the VRU server. If the voice browser does not detect any speech from the user, a prompt is read to the user (i.e., "I am having difficulty hearing you").

At block 416, the voice browser determines whether a re-prompt was specified in the error response or element. If a re-prompt is to be played to the user at block 416, the process proceeds to block 406 as described above. If a re-prompt is not to be played to the user at block 416, the voice browser determines whether there is a next step element specified in the error response at block 420. If another step element is specified in the error response at block 420, the process proceed to block 402 as described above. If another step element is not specific in the error response at block 420, the process proceeds to block 422.

If the voice browser does not detect a recognition error at block 410, the voice browser determines whether the user requested help at block 412. If the user requested help, an appropriate help response is played to the user (i.e., "please enter or speak your pin") at block 424.

At block 425, the voice browser determines whether a re-prompt was specified in the help response or step. If a re-prompt is specified in the help response at block 425, the process proceeds to block 406 as described above. If a re-prompt is not specified in the help response at block 425, the voice browser determines whether a next step element is specified in the help response at block 426. If another step element is specified in the help response at block 426, the process proceeds to block 402 as described above. If another step element is not specific in the help response at block 426, the process proceeds to block 428.

At block 430, the voice browser determines whether a cancel request has been indicated by the user. If the voice browser detects a cancel request from the user at block 430, an appropriate cancel message is played to the user at block 434 (i.e., "Do you wish to exit and return to the Main Menu?").

At block 436, the voice browser then determines whether there a next step element is specified in the cancel response or element. If another step element is specified in the cancel response at block 436, the process proceeds to block 448. If another step element is not specified in the error response at block 436, the process proceeds to block 422.

If a cancel request was not detected at block 430, the voice browser determines the next step element at block 432. At block 440, the voice browser determines whether there is an acknowledgement specified in the next step element. If there is no acknowledgement specified in the step element at block 440, the voice browser sets the current step element to the next step element at block 442 and then determines whether the next step element is within the same page at block 444.

If the next step element is within the same page as the current step element at block 444, the process proceeds to block 446. If the next step element is not within the same page as the current page at block 444, the process proceeds to block 448.

If an acknowledgement is specified in the next step element at block 440, an acknowledgement response is played to the user at block 450. The voice browser then determines whether a confirmation is specified in the information (i.e., a markup language document) at block 452. If a confirmation is not specified in the information at block 452, the process proceeds to block 442 as described above. If a confirmation is specified at block 452, the voice browser determines whether the response was recognized from the user a block 454 and then determines whether the response is affirmative at block 456.

If the voice browser receives an affirmative response at block 456, the process proceeds to block 442 as described above. If the voice browser does not receive an affirmative response from the user at block 456, the process proceeds to block 448.

The following text describes an exemplary markup language processed by the voice browser of the communication node 212. The markup language preferably includes text, recorded sound samples, navigational controls, and input controls for voice applications as further described below. The markup language enables system designers or developers of service or content providers to create application programs for instructing the voice browser to provide a desired user interactive voice service. The markup language also enables designers to dynamically customize their content. For example, designers can provide up-to-date news, weather, traffic, etc.

The markup language can be designed to express flow of control, state management, and the content of information flow between the communication node 212 and the user. The structure of the language can be designed specifically for voice applications and the markup language is preferably designed and delivered in units of dialog.

The markup language can include elements that describe the structure of a document or page, provide pronunciation of words and phrases, and place markers in the text to control interactive voice services. The markup language also provides elements that control phrasing, emphasis, pitch, speaking rate, and other characteristics. The markup language documents are preferably stored on databases of the information sources, such as the content providers 208 and 209 and the markup language servers 251 and 257.

FIG. 6 illustrates an exemplary markup language document that the voice browser of the communication node can process. The markup language document has a hierarchical structure, in which every element (except the dialog element) is contained by another element. Elements between another elements are defined to be children or a lower element of the tree. FIG. 7 illustrates a tree stucture of the markup language document of FIG. 6.

As shown in FIG. 6, the markup language document includes tags, denoted by <> symbols, with the actual element between the brackets. The markup language includes start tags ("<>") and end tags ("</>"). A start tag begins a markup element and the end tags ends the corresponding markup element. For example, in the markup language document as shown in FIG. 6, the DIALOG element (<dialog>) on line 2 begins a markup language document or page, and the dialog element (<dialog>) on line 26 indicates the markup language document has ended. The elements often have attributes which are assigned values as further described below.

The DIALOG element and STEP elements of a markup language document provide the basic structure of the document. The DIALOG element defines the scope of the markup language document, and all other elements are contained by the DIALOG element. The STEP elements define states within a DIALOG element (i.e., the STEP element defines an application state). For example, an application state can include initial prompts, help messages, error messages, or cleanup and exit procedures.

The DIALOG element and the associated STEP elements of a markup language document define a state machine that represents an interactive dialogue between the voice browser and the user. When the voice browser interprets the markup language document, the voice browser will navigate through the DIALOG element to different STEP elements as a result of the user's responses.

The following example illustrates an exemplary markup language document that the voice browser of the communication node can process. The example has one DIALOG element and two STEP elements.

```
<?XML VERSION="1.0"?>
<DIALOG>
    <STEP NAME="init">
        <PROMPT> Please select a soft drink. </PROMPT>
        <HELP> Your choices are coke, pepsi, 7 up,
            or root beer. </HELP>
```

-continued

```
    <INPUT TYPE="optionlist" NAME="drink">
        <OPTION NEXT="#confirm"> coke </OPTION>
        <OPTION NEXT="#confirm"> pepsi </OPTION>
        <OPTION NEXT="#confirm"> 7 up </OPTION>
        <OPTION NEXT="#confirm"> root beer </OPTION>
    </INPUT>
  </STEP>
  <STEP NAME="confirm">
      <PROMPT> You ordered a <VALUE NAME="drink"/>.
      </PROMPT>
  </STEP>
</DIALOG>
```

When the above markup language document is interpreted by the voice browser, the voice browser initially executes the STEP element called "init". First, the user will hear the text contained by the prompt element (i.e., "Please select a soft drink."). If the user responds "help" before making a selection, the user would hear the text contained with the HELP element (i.e., "Your choices are coke, pepsi, 7up, or root beer."). After the user makes a selection, the voice browser will execute the STEP element named "confirm", which will read back the user's selection and then exit the application. It is noted that the STEP elements in a markup language document are executed based on the user's responses not on the order of the STEP elements within the source file.

Although the definition of the "init" STEP element appears before and the definition of the "confirm" STEP element, the order in which they are defined has no impact on the order in which the voice browser navigates through them.

The following text describes the markup language elements, their attributes, and their syntax. The DIALOG element of the markup language (i.e., <DIALOG [BARGEIN="value"]> markup language document </DIALOG>) is the fundamental element of the markup language. The DIALOG element includes a BARGEIN attribute. The value of the BARGEIN attribute can be "Y" and "N". The BARGEIN attribute allows the DIALOG element to be interrupted at any time based upon a predetermined response from the user (i.e., wake up).

The DIALOG element defines the basic unit of context within an application, and typically, there is one DIALOG element per address (i.e., URL). Each DIALOG element contains one STEP element named "init". The execution of the DIALOG element begins with the STEP named "init".

The following example of a markup language document or page contains the DIALOG element.

```
<DIALOG>
    <STEP NAME="init">
        <PROMPT> Welcome to VoxML ™ voice markup
        language. </PROMPT>
    </STEP>
</DIALOG>
```

In the example above, the DIALOG element contains a single STEP element named "init". The STEP element has a single PROMPT element that will be read to the user via the text-to-speech unit 252. Since there is no INPUT element defined in the STEP element, the markup language application will terminate immediately after the PROMPT element is read.

The STEP element of the markup language (i.e., <STEP NAME="value"[PARENT="value"][BARGEIN="value"] [COST="value"]> text </STEP>) defines a state in a markup language document or page. The STEP element is contained by a DIALOG element. The STEP element includes a NAME attribute, a PARENT attribute, a BARGEIN attribute, and a COST attribute. The value of the NAME and PARENT attribute can be an identifier (i.e., a pointer or a variable name), the value of the BARGEIN attribute can be "Y" and "N", and the value of the COST attribute can be an integer.

The STEP element typically has an associated PROMPT element and INPUT element that define the application state. The following example illustrates the use of the STEP element in a markup language document.

```
<STEP NAME="askpython" PARENT="tvrating">
    <PROMPT> Please rate Monty Python's Flying
    Circus
        on a scale of 1 to 10. </PROMPT>
    <INPUT NAME="python" TYPE="number" NEXT="#drwho"
    />
</STEP>
```

The example shown above illustrates a STEP element that collects the user's opinion on one of several public television shows. The STEP element uses the PARENT attribute to share a common set of help and error elements with other TV-show-rating STEP elements. For example, the PARENT attribute can contain a HELP element explaining what a rating of 1, 5, and 10 would mean, and a common error message can remind the user that a numeric rating is expected.

The PROMPT element of the markup language (i.e., <PROMPT> text </PROMPT>) is used to define content (i.e., text or an audio file) that is to be presented to the user. Typically, the PROMPT element will contain text and several markup elements (i.e., the BREAK or EMP elements as described below) that are read to the user via the text-to-speech unit.

The PROMPT element can be contained within a STEP or a CLASS element. The following example illustrates the use of the PROMPT element in markup language document or page.

```
<STEP NAME="init">
    <PROMPT> How old are you? </PROMPT>
    <INPUT TYPE="number" NAME="age" NEXT=#weight"/>
</STEP>
```

In the example shown above, the text "How old are you?" will be played to the user via the text-to-speech unit, and then the voice browser will wait for the user to say his or her age.

The INPUT element of the markup language is used to define a valid user input within each STEP element. The INPUT element is contained within a STEP element. The INPUT element of the markup language includes an INPUT attribute. The value of the INPUT attribute can be a DATE input, a DIGIT input, a FORM input, a GRAMMAR input, a HIDDEN input, a MONEY input, a NONE element, a NUMBER input, an OPTIONLIST input, a PHONE input, a PROFILE input, a RECORD input, a TIME input, and a YORN element.

The DATE input of the INPUT attribute of the markup language (i.e., <INPUT TYPE="DATE" NAME="value" NEXT="value" [NEXTMETHOD="value"][TIsMEOUT="value"]/>) is used to collect a calendar date from the user. The DATE input includes a NAME attribute, a NEXT attribute, a NEXTMETHOD attribute, and a TIMEOUT attribute. The value of the NAME attribute can be an identifier, and the value of the NEXT attribute can be the next STEP address (i.e., a URL). The value of the NEXT-METHOD attribute can be a get and a post (i.e., an input into a Java Script program or a markup language server), and the value of the TIMEOUT attribute can be a number represented in milliseconds.

The following example illustrates the use of the DATE input in a markup language document.

```
<STEP NAME="init">
<PROMPT> What is your date of birth? <PROMPT>
    <INPUT TYPE="date" NAME="dob" NEXT="#soc"/>
    </STEP>
```

In the example above, the DATE input is used to gather the user's birthday, store it in a variable "dob", and then go to the STEP element named "sock". The DATE input makes use of an input grammar to interpret the user's response and store that response in a standard format.

The DATE input grammar can interpret dates expressed in several different formats. A fully defined date, such as, "next Friday, Jul. $10^{th}$, 1998" is stored as "07101998|Jul.|10|1998|Friday|next". If the date cannot be determined by the user's response, the ambiguous parts of the response will be omitted from the data. The response "July $4^{th}$", is stored as "????????|july|4|||", "Tomorrow" becomes "????????|||||tomorrow", "The $15^{th}$" is stored as "????????||15|||", and "Monday" becomes "????????||||Monday|".

The DIGITS input of the INPUT attribute of the markup language (i.e., <INPUT TYPE="DIGITS" NAME="value" NEXT="value" [NEXTMETHOD="value"] [TIMEOUT="value"] [MIN="value"] [MAX="value"]/>) is used to collect a series of digits from the user. The DIGITS input includes a NAME attribute, a NEXT attribute, a NEXT-METHOD attribute, a TIMEOUT attribute, a MIN attribute, and a MAX attribute. The value of the NAME attribute can be an identifier, the value of the NEXT attribute can be a next step address (i.e., a URL), the value of the NEXT-METHOD attribute can be a get and a post, and the value of the TIMEOUT attribute can be a number represented in milliseconds. The value of the MIN and MAX attributes can be minimum and maximum integer values, respectively.

The following example illustrates the use the DIGITS input in a markup language document or page.

```
<STEP NAME="init">
    <PROMPT> Please say your pin now. </PROMPT>
    <INPUT TYPE="digits" NAME="pin" NEXT="#doit"/>
</STEP>
```

In the example above, the DIGITS input is used to collect digits from the user, store the number in the a variable named "pin", and then go to the STEP named "doit". If the user were to speak, "four five six", in response to the PROMPT element, the value "456" would be stored in the variable "pin". The DIGITS input can collect the digits 0 (zero) through 9 (nine), but not other numbers like 20 (twenty). To collect double-digit numbers (i.e., 20 (twenty) or 400 (four-hundred), the NUMBER input can be used as further described below.

The FORM input of INPUT attribute of the markup language (i.e., <INPUT TYPE="FORM" NAME="value" MEHOD="value" ACTION="value" TIMEOUT="value"/>is used to collect input from the user, convert the input to text using the speech to text unit, and send the text to the markup language server. The FORM input includes a NAME attribute, a NEXT attribute, a METHOD attribute, an ACTION attribute and a TIMEOUT attribute. The value of the NAME attribute can be an identifier, and the value of the NEXT attribute can be a next step address (i.e., a URL, pointer or mamory address). The value of the METHOD attribute can be a get or a post, and the value of the ACTION attribute is a pointer to a script that processes the input on the server. The value of the TIMEOUT attribute can be a number represented in milliseconds.

The FORM input makes use of the speech to text unit to convert user input to text. The user input is then sent to the markup language server in a standard HTML <FORM> text format to be processed by a script on the server. If the user said "John Smith" then the text string "john smith" would be sent to the server using the pointer and address indicated by the ACTION attribute using the method indicated by the METHOD attribute in a <FORM>format.

The following is an example, also shown in FIG. 10, of the user of the FORM input in a markup language document.

```
<STEP NAME="order form">
    <PROMPT> What you like to order? </PROMPT>
    <INPUT TYPE="form" NAME="order" NEXT="#next
    order" METHOD="post"
    ACTION="http://www.test.com/cgi-bin/post-query"
    TIMEOUT="200" />
</STEP>
```

In the example shown above, the FORM input is used to collect an order input from the user, store the user input converted to text in the variable named "order", go to the next step named "next order", post the text to the address "htt:p://www.test.com/cai-bin/post-auery", and use a timeout value of 200 milliseconds.

The GRAMMAR input of the of the INPUT attribute of the markup language (i.e., <INPUT TYPE="GRAMMAR" SRC="value" NEXT="value" [NEXTMETHOD="value"] [TIMEOUT="value"]/>, <INPUT TYPE="GRAMMAR" SRC="value" NEXT="value" [NEXTMETHOD="value"] [TIMEOUT="value"]>RENAME elements </INPUT>, or <INPUT TYPE="GRAMMAR" SRC="value" [TIMEOUT="value"] [NEXT="value" [NEXTMETHOD="value"] ]>RESPONSE elements</INPUT>) is used to specify an input grammar when interpreting the user's responses. The GRAMMAR input includes a SCR attribute, a NEXT attribute, a NEXTMETHOD attribute, and a TIMEOUT attribute. The value of the SCR attribute can be a grammar address (i.e., a URL), and the value of the NEXT attribute can be a next step address (i.e., a URL). The value of the NEXTMETHOD attribute can be a get and a post, and the value of the TIMEOUT attribute can be a number represented in milliseconds.

The following example illustrates the use of the GRAMMAR input in a markup language document.

```
<STEP NAME="init">
    <PROMPT> Say the month and year in which the
        credit card expires. </PROMPT>
    <INPUT TYPE="GRAMMAR"
        SRC="gram://.SomeGrammar/month/year"
        NEXT="#stepNineteen"/>
</STEP>
```

The above example illustrates the use of the GRAMMAR input to generate a predetermined grammar corresponding to a month and year from the user, store the interpreted values in variables named "month" and "year", and then go to the step named "stepNineteen".

The HIDDEN input of the INPUT attribute of the markup language (i.e., <INPUT TYPE="HIDDEN" NAME="value" VALUE="value"/>) is used to store a value in a variable. The HIDDEN input includes a NAME attribute and a VALUE attribute. The value of the NAME attribute can be an identifier, and the value of the VALUE attribute can be a literal value.

The following example illustrates the use of the HIDDEN input in a markup language document.

```
<STEP NAME="init">
    <PROMPT> Login sequence complete.
        Are you ready to place your order?
    </PROMPT>
    <INPUT TYPE="hidden" NAME="firstname"
        VALUE="Bill"/>
    <INPUT TYPE="hidden" NAME="lastname"
        VALUE="Clinton"/>
    <INPUT TYPE="hidden" NAME="favorite"
        VALUE="fries"/>
    <INPUT TYPE="optionlist">
        <OPTION NEXT="#order"> yes </OPTION>
        <OPTION NEXT="#wait"> not yet </OPTION>
    </INPUT>
</STEP>
```

In the example shown above, the HIDDEN input is used to create variables and assign values to those variables.

In this example, the user has completed the login sequence and certain information is stored in variables as soon as the user's identity has been established. This information could then be used later in the application without requiring another access into the database.

The MONEY input of the INPUT attribute of the markup language (i.e., <INPUT TYPE="MONEY" NAME="value" NEXT="value" [NEXTMETHOD="value"] [TIMEOUT="value"]/>) is used to collect monetary amounts from the user. The MONEY input includes a NAME attribute, a NEXT attribute, a NEXTMETHOD attribute, and a TIMEOUT attribute. The value of the NAME attribute can be an identifier, and the value of the NEXT attribute can be a next step address (i.e., a URL). The value of the NEXTMEHOD attribute can be a get and a post, and the value of the TIMEOUT attribute can be a number represented in milliseconds.

The MONEY input makes use of an input grammar to interpret the user's response and store that response in a standard format. The input grammar is able to interpret various ways to express monetary amounts. The data is preferably stored in integer format, in terms of cents. "Five cents" is stored as "5", "five dollars" is stored as "500", and "a thousand" is stored as "100000". In the case where the units are ambiguous, the grammar assumes dollars, in which "a thousand" is stored as if the user had said "a thousand dollars".

The following example illustrates the use of the MONEY input in a markup language document.

```
<STEP NAME="init">
    <PROMPT> How much would you like to deposit?
    </PROMPT>
    <INPUT TYPE="money" NAME="dep"
        NEXT="#deposit"/>
</STEP>
```

The example shown above, the MONEY input is used to collect the amount of money that the user would like to deposit in his account, store that amount in a variable named "dep", and then go to the STEP named "deposit".

The NONE input of the INPUT attribute of the markup language (i.e., <INPUT TYPE="NONE" NEXT="value" [NEXTMETHOD="value"]/>) is used to specify the next location for the voice browser to go to continue execution when no response is collected from the user. The NONE input includes a NEXT attribute and a NEXTMETHOD attribute. The value of the NEXT attribute can be a next step address (i.e., a URL), and the value of the NEXTMETHOD attribute can be a get and a post.

The following example illustrates the use of the NONE input in a markup language.

```
<STEP NAME="init">
    <PROMPT> Welcome to the system. </PROMPT>
    <INPUT TYPE="none" NEXT="#mainmenu"/>
</STEP>
```

In the example shown above, the NONE input is used to jump to another STEP element in this dialog without waiting for any user response. In this example, the user would hear the phrase "Welcome to the system" followed immediately by the prompt of the main menu.

The NUMBER input of INPUT attribute of the markup language (i.e., <INPUT TYPE="NUMBER" NAME="value" NEXT="value" [NEXTMETHOD="value"] [TIMEOUT="value"]/>) is used to collect numbers from the user. The NUMBER input includes a NAME attribute, a NEXT attribute, a NEXTMETHOD attribute, and a TIMEOUT attribute. The value of the NAME attribute can be an identifier, and the value of the NEXT attribute can be a next step address (i.e., a URL). The value of the NEXTMETHOD attribute can be a get and a post, and the value of the TIMEOUT attribute can be a number represented in milliseconds.

The following example illustrates the use of the NUMBER input in a markup language document or page.

```
<STEP NAME="init">
    <PROMPT> Please say your age now. </PROMPT>
    <INPUT TYPE="number" NAME="age" NEXT="#doit"/>
</STEP>
```

In the example shown above, the NUMBER input is used to collect numbers from the user, store the number in a variable named "age", and then go to the STEP element named "doit". If the user were to say, "eighteen", in response to the PROMPT element, the value "18" would be stored in the variable "age". The NUMBER input will collect numbers like 20 (i.e. twenty), but only one number per input. To collect a series of digits like "four five six" (i.e. "456"), the DIGITS input can be used as described above.

The OPTIONLIST input of INPUT attribute of the markup language (i.e., <INPUT TYPE="OPTIONLIST" [NAME="value"] [TIMEOUT="value"] [NEXT="value" [NEXTMETHOD="value"]]>OPTION elements </INPUT>) is used to specify a list of options from which the user can select. The OPTIONLIST input includes a NAME attribute, a NEXT attribute, a NEXTMETHOD attribute, and a TIMEOUT attribute. The value of the NAME attribute can be an identifier, and the value of the NEXT attribute can be a next step URL. The value of the NEXTMETHOD attribute can be a get and a post, and the value of the TIMEOUT attribute can be a number represented in milliseconds.

The OPTIONLIST input is used in conjunction with the OPTION element, which defines the specific user responses and the behavior associated with each OPTION element. The following example illustrates the use of the OPTION-LIST element in a markup language document.

```
<STEP NAME="init">
    <PROMPT> What would you like to drink? </PROMPT>
    <INPUT TYPE="optionlist">
        <OPTION NEXT="#coke"> coke </OPTION>
        <OPTION NEXT="#coke"> coca-cola </OPTION>
        <OPTION NEXT="#pepsi"> pepsi </OPTION>
        <OPTION NEXT="#rc"> r c </OPTION
    </INPUT>
</STEP>
```

In the example shown above, the voice browser will go to a different STEP element or state depending on which cola the user selects. If the user said "cokes" or "coca-cola", the voice browser would go to the STEP element named "coke".

The PHONE input of INPUT attribute of the markup language (i.e., <INPUT TYPE="PHONE" NAME="value" NEXT="value" [NEXTMETHOD="value"] [TIMEOUT="value"]/>) is used to collect telephone numbers from the user. The PHONE input includes a NAME attribute, a NEXT attribute, a NEXTMETHOD attribute, and a TIMEOUT attribute. The value of the NAME attribute can be an identifier, and the value of the NEXT attribute can be a next step address (i.e., a URL). The value of the NEXTMETHOD attribute can be a get and a post, and the value of the TIMEOUT attribute can be a number represented in milliseconds.

The PHONE input makes use of an input grammar to interpret the user's response and store that response in a standard format. The phone number is interpreted as a string of digits and stored in a variable. If a user said "One, eight zero zero, seven five nine, eight eight eight eight", the response would be stored as "18007598888".

The following is an example of the use of the PHONE input in a markup language document.

```
<STEP NAME="phone">
    <PROMPT> What is your phone number? </PROMPT>
    <INPUT TYPE="phone" NAME="ph" NEXT="#fax"/>
</STEP>
```

In this example shown above, the PHONE input is used to collect a telephone number from the user, store the number in the variable named "ph", and go to the STEP named "fax".

The PROFILE input of INPUT attribute of the markup language (i.e., <INPUT TYPE="PROFILE" NAME= "value" PROFNAME="value" [SUBTYPE="value"]/>) is used to collect the user's profile information (i.e, first name, last name, mailing address, email address, and notification address). The user profile information is stored in the database 244 of the system.

The PROFILE input includes a NAME attribute, a PROFNAME attribute, and a SUBTYPE attribute. The value of the NAME attribute can be an identifier, the value of the PROFNAME attribute can be a profile element name (string), and the value of the SUBTYPE attribute can be profile element subtype (string).

The following example illustrates the use of the PROFILE input in a markup language document.

```
<STEP NAME="getinfo">
    <INPUT TYPE="profile" NAME="firstname"
        PROFNAME="N" SUBTYPE="first"/>
    <PROMPT> Hello, <VALUE NAME="firstname"/>
        Please say your pin. </PROMPT>
    <INPUT TYPE="digits" NAME="pin"
        NEXT="#verify"/>
</STEP>
```

In the example above, the PROFILE input is used to retrieve the user's first name and store the string in a variable named "firstname". The string containing the name is then inserted into the PROMPT element using a VALUE element as further described below. When using the PROFILE input, more than one INPUT element can be included in the same STEP element because the PROFILE input is not an interactive INPUT element. Each STEP element contains only one INPUT element that accepts a response from the user.

The following table lists the valid combinations of profile names and their associated subtypes

| Profile Name | Subtype | Description |
| --- | --- | --- |
| ADR | POSTAL | postal address |
|  | PARCEL | parcel address |
|  | HOME | home address |
|  | WORK | work address |
|  | DOM | domestic address |
|  | INTL | international address |
| BDAY | none | birthday |
| EMAIL | none | primary email address |
|  | NOTIFICATION | notification email address |
| FN | none | formatted name |
| GEO | none | geographic location (longitude:lattitude) |
| KEY | none | public encryption key |
| LABEL | none | mailing label |
| MAILER | none | email program used |
| N | FIRST | first name |
|  | LAST | last name |
|  | MIDDLE | middle name |
|  | PREFIX | prefix (e.g. Mr., Mrs., Dr.) |
|  | SUFFIX | suffix (e.g. Jr., D.D.S, M.D.) |
| ORG | none | organization |
| ROLE | none | job role or position |
| TEL | HOME | home telephone number |
|  | WORK | work telephone number |
|  | MSG | voicemail telephone number |

| Profile Name | Subtype | Description |
|---|---|---|
| | VOICE | voice call telephone number |
| | FAX | fax call telephone number |
| | CELL | cellular telephone number |
| | PREF | preferred telephone number |
| TITLE | none | job title |
| TZ | none | time zone |
| UID | none | globally unique id |
| URL | none | URL of home page |
| VERSION | none | version of Vcard |

The notification address shown above can be used to send a user urgent or timely information (i.e., sending information to a pager). The format of the notification address is preferably of an email address provided by the user when his or her subscription is activated. The user's notification address would be stored a variable named "$n_{13}$ addr". The application could then use this email address to send a message to the user. To retrieve the notification address from the voice browser, the PROFILE input can be used in a markup language document in the following manner:

```
<INPUT TYPE="profile" NAME="n_addr"
    PROFNAME="email" SUBTYPE="notification"/>
```

The RECORD input of the INPUT attribute of the markup language (i.e., <INPUT TYPE="RECORD" TIMEOUT="value" STORAGE="value" [FORMAT="value"] [NAME="value"] NEXT="value" [NEXTMETHOD="value"]/>) is used to record an audio sample and to store that audio sample in a specified location. The RECORD input includes a TIMEOUT attribute, a FORMAT attribute, a NAME attribute, a STORAGE attribute, a NEXT attribute, and a NEXTMETHOD attribute. The value of the TIMEOUT attribute can be the maximum record time represented in milliseconds, the value of the FORMAT attribute can be a recorded audio format (audio/wav), the value of the NAME attribute can be an identifier, the value of the STORAGE attribute can be a file and a request, the value of the NEXT attribute can be a next step address (i.e., a URL), and the value of the NEXTMETHOD attribute can be a get, post and put.

The following two examples illustrate the RECORD input in a markup language document.

```
<STEP NAME="init">
    <PROMPT> Please say your first and last name.
    </PROMPT>
    <INPUT TYPE="record" TIMEOUT="7000"
        NAME="theName" STORAGE="REQUEST"
        NEXT="http://wavhost/acceptwav.asp"
        NEXTMETHOD="POST"/>
</STEP>
```

In the example shown above, the RECORD input is used to record a seven second audio sample, and then "POSTS" that sample to the remote machine named "wavhost". The response to the "POST" has to be a dialog which continues the execution of the application.

```
<STEP NAME="init">
    <PROMPT> Please say your first and last name.
    </PROMPT>
    <INPUT TYPE="record" TIMEOUT="7000"
        NAME="theName" STORAGE="FILE"
        NEXT="#reccomplete" NEXTMETHOD="GET"/>
</STEP>
```

In the example shown above, the RECORD input is used to record another seven second audio sample. However, the sample is stored in a file, instead of sent in the HTTP request as it was in the previous example. The name of the file is chosen by the voice browser automatically and is stored in a variable named "theName". After storing the audio sample in the file, the voice browser will continue execution at the URL specified by the NEXT attribute. In contrast to the previous example, the value of the variable "theName" will be the name of the audio file. In the earlier example (where the audio sample was transmitted via the HTTP request), the value of the variable "theName" would be null.

The TIME input type of the INPUT attriute of the markup language (i.e., <INPUT TYPE="TIME" NAME="value" NEXT="value" [NEXTMETHOD="value"] [TIMEOUT="value"]/>) is used to collect a time of day from the user. The TIME input includes a NAME attribute, a NEXT attribute, a NEXTMETHOD attribute, and a TIMEOUT attribute. The value of the NAME attribute can be an identifier, and the value of the NEXT attribute can be a next step address (i.e., a URL). The value of the NEXTMETHOD attribute can be a get and a post, and the value of the TIMEOUT attribute can be a number represented in milliseconds.

The TIME input makes use of an input grammar to interpret the user's response and to store that response in a standard format. This grammar will interpret responses of various forms, including both 12-hour and 24-hour conventions. "Four oh three PM" becomes "403P". Note that "P" is appended to the time. Likewise, "Ten fifteen in the morning" becomes "1015A". "Noon" is stored as "1200P"f, and "Midnight" is stored as "1200A". Military time, such as, "Thirteen hundred hours" becomes "100P". If the user does not specify the morning or evening, no indication is stored in the variable (i.e.,"Four o'clock" is stored as "1400").

The following example illustrates the TIME input in a markup language document.

```
<STEP NAME="init">
    <PROMPT> What time would you like your wakeup
        call? </PROMPT>
    <INPUT TYPE="time" NAME="wakeup"
        NEXT="#record"/>
</STEP>
```

In the example shown above, the TIME input is used to collect a time of day from the user, store that data in the variable named "wakeup", and then go to the STEP element named "record".

The YORN input of the INPUT attribute of the markup language (i.e, <INPUT TYPE="YORN" NAME="value" [TIMEOUT="value"] NEXT="value" [NEXTMETHOD="value"]/>, or <INPUT TYPE="YORN" [NAME="value"] [TIMEOUT="value"] [NEXT="value" (NEXTMETHOD="value"] ]>CASE elements </INPUT>) is used to collect "yes" or "no" responses from the user. The YORN input includes a NAME attribute, a NEXT attribute, a NEXTMETHOD attribute, and a TIMEOUT attribute. The value of the NAME attribute can be an identifier, and the value of the NEXT attribute can be a next step address (i.e., a URL). The value of the NEXTMETHOD attribute can be a get and a post, and the value of the TIMEOUT attribute can be a number represented in milliseconds.

The YORN input maps a variety of affirmative and negative responses to the values "Y" and "N". The YORN input stores the value "Y" for affirmative responses and the value "N" for negative responses. Affirmative and negative responses are determined using an input grammar that maps various user responses to the appropriate result.

The following example illustrates the user of the YORN input in a markup language document.

```
<STEP NAME="ask">
    <PROMPT> Fire the missles now? </PROMPT>
    <INPUT TYPE="YORN" NAME="fire"
    NEXT="#confirm"/>
</STEP>
```

In the example shown above, the YORN input is used to collect a "yes" or "no" response from the user, store that response into a variable named "fire", and then go to the STEP named "confirms".

The OPTION element of the markup language (i.e. <OPTION [NEXT="value" [NEXTMETHOD="value"]] [VALUE="value"]> text </OPTION>) is used to define the type of response expected from the user in a STEP element or state. The OPTION input includes a VALUE attribute, a NEXT attribute, and a NEXTMETHOD attribute. The value of the VALUE attribute can be a literal value, the value of the NEXT attribute can be a next step address (i.e., a URL), and the value of the NEXTMETHOD attribute can be a get and a post. The OPTION element can exist within the INPUT element, and then only when using the OPTION-LIST input.

The following two examples illustrate the use of the OPTION element in a markup language document.

```
<INPUT NAME="choice" TYPE="optionlist">
    <OPTION NEXT="#doit" VALUE="1"> one </OPTION>
    <OPTION NEXT="#doit" VALUE="2"> two </OPTION>
</INPUT>
```

The example shown above illustrates the use of the OPTION element within the INPUT element. In this example, the first OPTION element would be executed when the user responded with "one", and the second OPTION would be executed when the user responded with "two". If the user said "one", the value of the variable named "choice" would be "1", because of the use of the VALUE attribute. Because the NEXT attributes for both of the OPTION element in this OPTIONLIST element are the same, the voice browser would proceed to the STEP element named "doit" when either "one"0 or "two" was recognized.

```
<INPUT TUPE="optionlist">
    <OPTION
    NEXT="http://localhost/vml/weather.asp">
        weather </OPTION>
    <OPTION NEXT="http://localhost/vml/news.asp">
        news </OPTION>
    <OPTION
```

-continued

```
    NEXT="http://localhost/vml/traffic.asp">
        traffic </OPTION>
</INPUT>
```

The example shown above illustrates the use of the OPTION element to select one of three applications. Note that the URLs used in the NEXT attributes are full HTTP URLS, and that unlike the previous example, each OPTION element has a unique NEXT attribute.

The OPTIONS element of the markup language (i.e., <OPTIONS/>) describes the type of input expected within a given STEP element. The OPTIONS element can be used in HELP elements to present the user with a complete list of valid responses. The OPTIONS element can be used anywhere that text is read to the user. The OPTIONS element can be contained by a PROMPT, EMP, PROS, HELP, ERROR, or ACK element.

The following example illustrates the use of the OPTIONS element in a markup language document.

```
<CLASS NAME="helpful">
    <HELP> Your choices are: <OPTIONS/> </HELP>
</CLASS>
```

The example shown above illustrates how the OPTIONS element can be used to construct a "helpful" class. Any STEP elements that directly or indirectly name "helpful" as a PARENT element respond to a helpful request (i.e., "help") by speaking the message, in which the OPTIONS element expands to a description of what can be said by the user at this point in the dialog.

The ACK element of the markup language (i.e., <ACK [CONFIRM="value"] [BACKGROUND="value"] [REPROMPT="value"] > text </ACK>) is used to acknowledge the transition between Step elements, usually as a result of a user response. The ACK element includes a CONFIRM attribute, a BACKGROUND attribute, and a REPROMPT attribute. The value of the BACKGROUND and REPROMPT attributes can be a "Y" and "N", and the CONFIRM attribute can be a YORN element as described above. The ACK element can be contained within a STEP element or a CLASS element as further described below.

The following is an example of a markup language document containing the Ack element.

```
<STEP NAME="card_type">
    <PROMPT>
        What type of credit card do you have?
    </PROMPT>
    <INPUT NAME="type" TYPE="optionlist">
        <OPTION NEXT="#exp">visa </OPTION>
        <OPTION NEXT="#exp">mastercard </OPTION>
        <OPTION NEXT="#exp">discover </OPTION>
    </INPUT>
    <ACK CONFIRM="YORN" REPROMPT="Y">
        I thought you said <VALUE NAME="type"/>
        <BREAK/> Is that correct?
    </ACK>
</STEP>
```

In the example above, the ACK element is used to confirm the user's choice of credit card. When this element is interpreted by the voice browser, the PROMPT element is read to the user using text-to-speech unit 252. The system waits until the user responds with "visa", "mastercard", or "discover" and then asks the user to confirm that the type of card was recognized correctly. If the user answers "yes" to the ACK element, the voice browser will proceed to the STEP element named "exp". If the user answers "no" to the ACK element, the text of the PROMPT element will be read again, and the user will be allowed to make his or her choice again. The voice browser then re-enters or executes the STEP element again.

The AUDIO element of the markup language (i.e., <AUDIO SRC="value"/>) specifies an audio file that should be played. The AUDIO element includes a SRC attribute. The value of the SRC attribute can be an audio file URL. The AUDIO element can be contained within a PROMPT, EMP, PROS, HELP, ERROR, CANCEL, or ACK element.

The following markup language contains the AUDIO element.

```
<PROMPT>
    At the tone, the time will be 11:59 p m
    <AUDIO SRC="http://localhost/sounds/beep.wav"/>
</PROMPT>
```

In the example above, the AUDIO element is included in a PROMPT element. When interpreted by the voice browser, a prompt (i.e., "At the tone, the time will be 11:59 pm.") will be played to the user, and the WAV file "beep.wav" will be played to the user as specified by the AUDIO element.

The BREAK element of the markup language (i.e., <BREAK [MSECS="value"|SIZE="value"]/>) is used to insert a pause into content or information to be played to the user. The BREAK element includes a MSEC attribute and a SIZE attribute. The value of the MSEC attribute can include a number represented in milliseconds, and the value of the SIZE attribute can be none, small, medium, and large.

The BREAK element can be used when text or audio sample is to be played to the user. The BREAK element can be contained within a PROMPT, EMP, PROS, HELP, ERROR, CANCEL, or ACK element. The following markup language contains the BREAK element.

```
<PROMPT>
    Welcome to Earth. <BREAK MSECS="250"/>
    How may I help you?
</PROMPT>
```

In the example above, the BREAK element is used with a MSECS attribute, inside a PROMPT element. When interpreted by the voice browser, a prompt (i.e, "Welcome to Earth.") is read to the user. The system will then pause for 250 milliseconds, and play "How may I help you?".

Alternatively, the SIZE attribute (i.e., "small", "medium", and "large") of the BREAK element can be used to control the duration of the pause instead of specifying the number of milliseconds as shown below.

```
<PROMPT>
    Welcome to Earth. <BREAK SIZE="medium"/>
    How may I help you?
</PROMPT>
```

The OR element of the markup language (i.e., <OR/>) is used to define alternate recognition results in an OPTION element. The OR element is interpreted as a logical OR, and is used to associate multiple recognition results with a single NEXT attribute.

The following example illustrates the use of the OR element in a markup language document.

```
<INPUT TYPE="optionlist">
    <OPTION NEXT="#coke_chosen">
        coke <OR/> coca-cola
    </OPTION>
    <OPTION NEXT="#pepsi_chosen"> pepsi </OPTION>
</INPUT>
```

The example shown above illustrates the use of the OR element within an OPTION element. As shown above, the user may respond with either "coke" or "coca-cola", and the voice browser will proceed to the STEP named "coke_chosen".

The CANCEL element of the markup language (i.e., <CANCEL NEXT="value" [NEXTMETHOD="value"]/> or <CANCEL NEXT="value" [NEXTMETHOD="value"]> text </CANCEL>) is used to define the behavior of the application in response to a user's request to cancel the current PROMPT element. The CANCEL element includes a NEXT attribute and a NEXTMETHOD attribute. The value the NEXT attribute can be a next step address (i.e., a URL), and the value of the NEXTMETHOD attribute can be a get and a post.

The CANCEL element can be invoked through a variety of phrases. For example, the user may say only the word "cancel", or the user may say "I would like to cancel, please."The CANCEL element can be contained within a STEP element or a CLASS element. When the voice browser detects "cancel" from the user, the voice browser responds based upon the use of the CANCEL element in markup language document. If no CANCEL element is associated with a given STEP element, the current prompt will be interrupted (if it is playing) and will stay in the same application state and then process any interactive inputs.

The following example illustrates a markup language containing the CANCEL element.

```
<STEP NAME="report">
    <CANCEL NEXT="#traffic_menu"/>
    <PROMPT> Traffic conditions for Chicago,
    Illinois,
    Monday, May 18. Heavy
    congestion on ... </PROMPT>
    INPUT TYPE="optionlist">
        <OPTION NEXT="#report"> repeat </OPTION>
        <OPTION NEXT="#choose"> new city </OPTION>
    </INPUT>
</STEP>
```

The example above illustrates the use of the CANCEL element to specify that when the user says "cancel", the voice browser proceeds to the STEP element named "traffic_menu", instead of the default behavior, which would be to stop the PROMPT element from playing and wait for a user response. The user can also interrupt the PROMPT element by speaking a valid OPTION element. In this example, the user could interrupt the PROMPT element and get the traffic conditions for a different city by saying "new city".

The CASE element of the markup language (i.e., <CASE VALUE="value" NEXT="value" [NEXTMETHOD=

"value"]/>) is used to define the flow of control of the application, based on the values of internal markup language variables. The CASE input includes a VALUE attribute, a NEXT attribute, and a NEXTMETHOD attribute. The value of the VALUE attribute can be a literal value, the value of the NEXT attribute can be a next step address (i.e. a URL), and the value of the NEXTMETHOD attribute can be a get and a post. The CASE element can be contained by a SWITCH element or an INPUT element, when using an input type of the INPUT element that collects a single value (i.e., DATE, DIGITS, MONEY, PHONE, TIME, YORN).

The following example illustrates a markup language containing a CASE element.

```
<SWITCH FILED="pizza">
  <CASE VALUE="pepperoni" NEXT="#p_pizza"/>
  <CASE VALUE="sausage" NEXT="#s_pizza"/>
  <CASE VALUE="veggie" NEXT="#v_pizza"/>
</SWITCH>
```

In the example above, the markup language shows the use of the CASE element within the SWITCH element. In this example, the CASE elements are used to direct the voice browser to different URLs based on the value of the markup language variable "pizza".

The CLASS element of the markup language (i.e., <CLASS NAME="value" [PARENT="value"] [BARGEIN="value"][COST="value"]> text </CLASS>) is used to define a set of elements that are to be reused within the content of a dialog. For example, application developers can define a set of elements once, and then use them several times. The CLASS input includes a NAME attribute, a PARENT attribute, a BARGEIN attribute, and a COST attribute. The value of the NAME and the PARENT attribute can be an identifier. The value of the BARGEIN attribute can be "Y" and "N", and the value of the COST attribute can be an integer number.

The CLASS element can be used to define the default behavior of an ERROR element, a HELP element, and a CANCEL element, within a given DIALOG element. The CLASS element can be contained by a DIALOG element. The following example shows a markup language document containing the CLASS element.

```
<CLASS NAME="simple">
  <HELP> Your choices are <OPTIONS/> </HELP>
  <ERROR> I did not understand what you said.
    Valid responses are <OPTIONS/> </ERROR>
</CLASS>
<STEP NAME="beverage" PARENT="simple">
  <PROMPT> Please choose a drink. </PROMPT>
  <INPUT NAME="drink" TYPE="optionlist">
    <OPTION NEXT="#food"> coke </OPTION>
    <OPTION NEXT="#food"> pepsi </OPTION>
  </INPUT>
</STEP>
<STEP NAME="food" PARENT="simple">
  <PROMPT> Please choose a meal. </PROMPT>
  <INPUT NAME="meal" TYPE="optionlist">
    <OPTION NEXT="#deliver"> pizza </OPTION>
    <OPTION NEXT="#deliver"> tacos </OPTION>
</INPUT>
  </STEP>
```

In the example above, the markup language document illustrates the use of the CLASS element to define a HELP element and an ERROR element that will be used in-several steps within this DIALOG element. The markup language also illustrates the use of the PARENT attribute in the STEP element to refer to the CLASS element, and therefore inherit the behaviors defined within it. When interpreted by the voice browser, the STEP element will behave as if the HELP and ERROR elements that are defined in the CLASS element were defined explicitly in the steps themselves The EMP element of the markup language (i.e., <EMP [LEVEL="value"]> text </EMP>) is used to identify content within text that will be read to the user where emphasis is to be applied. The EMP element includes a LEVEL attribute. The value of the LEVEL element can be none, reduced, moderate, and strong. The EMP element can be contained within a PROMPT, EMP, PROS, HELP, ERROR, CANCEL, or ACK element. The following example of a markup language document contains the EMP element.

```
<PROMPT>
  This example is
  <EMP LEVEL="strong"> really </EMP>
  simple.
</PROMPT>
```

In the above example, the EMP element is used to apply "strong" emphasis to the word "really" in the PROMPT element. The actual effect on the speech output is determined by the text-to-speech (TTS) software of the system. To achieve a specific emphatic effect, the PROS element, as further described below, can be used instead of the EMP element.

The ERROR element of the markup language (i.e., <ERROR [TYPE="value"] [ORDINAL="value"] [REPROMPT="value"] [NEXT="value" [NEXTMETHOD="value"]]> text </ERROR>) is used to define the behavior of the application in response to an error. The ERROR element includes a TYPE attribute, an ORDINAL attribute, a REPROMPT attribute, a NEXT attribute, and a NEXTMETHOD attribute. The value of the TYPE attribute can be all, nomatch, nospeech, toolittle, toomuch, noauth, and badnext. The value of the ORDINAL attribute can be an integer number, the value of the REPROMPT attribute can be GYP or "N", the value of the NEXT attribute can be a next step address (i.e., a URL), and the value of the NEXTMETHOD attribute can be a get and a post.

If the application developer does not define the behavior of an ERROR element for a given STEP element, the default behavior will be used. The default behavior for the ERROR element is to play the phrase "An error has occurred.", remain in the current STEP element, replay the PROMPT element, and wait for the user to respond. The ERROR element can be contained within a STEP or a CLASS element.

The following example illustrates the use of the ERROR element in a markup language document.

```
1  <STEP NAME="errors">
2    <ERROR TYPE="nomatch"> First error message.
3      I did not understand what you said. </HELP>
4    <ERROR TYPE="nomatch" ORDINAL="2">
5      Second error message.
6      I did not understand what you said </HELP>
7    <PROMPT> This step tests error messages.
8      Say 'oops' twice. Then say 'done' to
9      choose another test. </PROMPT>
```

-continued

```
10    <INPUT TYPE="OPTIONLIST">
11        <OPTION NEXT="#end"> done </OPTION>
12    </INPUT>
13  </STEP>
```

In the example above, the ERROR element is used to define the application's behavior in response to an error. On line 2, the error message is defined to be used the first time an error of type "nomatch" occurs in this STEP element. On line 4, the error message is to be used the second and all subsequent times an error of type "nomatch" occurs in this STEP.

The ORDINAL attribute of the ERROR element of the markup language determines which message will be used in the case of repeated errors within the same STEP element. The voice browser can choose an error message based on the following algorithm. If the error has occurred three times, the voice browser will look for an ERROR element with an ORDINAL attribute of "3". If no such ERROR element has been defined, the voice browser will -look for an ERROR element with an ORDINAL attribute of "2", and then "1", and then an ERROR element with no ORDINAL attribute defined. Thus, if the ERROR element is defined with the ORDINAL attribute of "6" in the STEP element shown above, and the same error occurred six times in a row, the user would hear the first error message one time, then the second error message four times, and finally the error message with ORDINAL attribute of "6".

The HELP element of the markup language (i.e.,<HELP [ORDINAL="value"] [REPROMPT="value"] [NEXT= "value" [NEXTMETHOD="value"]]> text </HELP>) is used to define the behavior of the application when the user asks for help. The HELP element includes an ORDINAL attribute, a REPROMPT attribute, a NEXT attribute, and a NEXTMETHOD attribute. The value of the ORDINAL attribute can be an integer number, and the value of the REPROMPT attribute can be a "Y" and "N". The value of the NEXT attribute can be a next step address (i.e., a URL), and the value of the NEXTMETHOD attribute can be a get and a post.

The HELP element, like CANCEL the element, can be detected through a variety of phrases. The user may say only the word "help", or the user may say "I would like help, please." In either case, the HELP element will be interpreted. The HELP element can be contained within a STEP element or a CLASS element.

When the voice browser detects "help" from the user, the voice browser responds based upon the use of the HELP element in markup language document. If no HELP element is associated with a given STEP, the current prompt will be interrupted (if it is playing), the user will hear "No help is available.", and will stay in the same application state and process any interactive inputs.

The following example illustrates the use of the HELP element in a markup language document.

```
1  <STEP NAME="helps">
2    <HELP REPROMPT="Y"> First help message.
3       You should hear the prompt again. </HELP>
4    <HELP ORDINAL="2"> Second help message.
5       You should not hear the prompt now. </HELP>
6    <PROMPT> This step tests help prompts.
7       Say 'help' twice. Then say 'done' to
```

```
8       choose another test. </PROMPT>
9    <INPUT TYPE="OPTIONLIST">
10       <OPTION NEXT="#end"> done </OPTION>
11   </INPUT>
12  </STEP>
```

In the example above, the HELP element is used to define the application's behavior in response to the user input "help". On line 2, the help message is defined to be used the first time the user says "help". On line 4, the help message is defined to be used the second and all subsequent times the user says "help". It should also be noted that through the use of the REPROMPT attribute, the prompt will be repeated after the first help message, but it will not be repeated after the second help message.

The ORDINAL attribute of the HELP element of the markup language determines which message will be used in the case of repeated utterances of "help" within the same STEP element. The voice browser will choose a help message based on the following algorithm. If the user has said "help" three times, the voice browser will look for a HELP element with an ORDINAL attribute of "3". If no such HELP element has been defined, the voice browser will look for a HELP element with an ORDINAL attribute of "2", and then "1", and then a HELP element with no ORDINAL attribute defined. Thus, if a HELP element is defined with ORDINAL attribute of "6" in the STEP element shown above, and the user said "help" six times in a row, the user would hear the first help message one time, then the second help message four times, and finally the help message with ORDINAL attribute of "6".

The PROS element of the markup language (i.e., <PROS [RATE="value"] [VOL="value"] [PITCH="value"] [RANGE="value"]> text </PROS>) is used to control the prosody of the content presented to the user via PROMPT, HELP, ERROR, CANCEL, and ACK elements. Prosody affects certain qualities of the text-to-speech presentation, including rate of speech, pitch, range, and volume. The PROS element includes a RATE attribute, a VOL attribute, a PITCH attribute, and a RANGE attribute. The value of the RATE attribute can be an integer number representing words per minute, and the value of the VOL attribute can be an integer number representing volume of speech. The value of the PITCH attribute can be an integer number representing pitch in hertz, and the value of the RANGE attribute can be an integer number representing range in hertz. The PROS element can be contained within a PROMPT, EMP, PROS, HELP, ERROR, CANCEL, or ACK element.

The following example illustrates the use of the pros element.

<PROMPT> Let me tell you a secret:
<PROS VOL="0.5"> I ate the apple. </PROS>
</PROMPT>

In the example shown above, the phrase "I ate the apple" is spoken with one half of the normal volume.

The RENAME element of the markup language (i.e., <RENAME RECNAME="value" VARNAME="value"/>) is used to rename recognition slots in grammars, such that the resulting variable name can be different from the name of the recognition slot defined in the grammar. The rename element includes a VARNAME attribute and a RECNAME attribute. The value of the VARNAME and the RECNAME attributes can be identifiers. The RENAME element can exist only within the INPUT element, and then only when using the GRAMMAR input type.

The following example illustrates the use of the RENAME element in a markup language document.

```
<INPUT TYPE="GRAMMAR"
    SRC="http://www.foo.com/mygram.grm"
    NEXT="http://www.fancyquotes.com/vmlstocks.asp">
    <RENAME VARNAME="sym" RECNAME="symbol">
    <RENAME VARNAME="detail" RECNAME="quotetype">
</INPUT>
```

In the example shown above, the RENAME element is used to account for differences in the variable names collected from a grammar and those expected by another script. In particular, a grammar from foo.com is used to provide input to an application hosted by fancyquotes.com. Because, in this example, the grammar and script have been developed independently, the RENAME element is used to help connect the grammar and the stock-quoting application.

The RESPONSE element of the markup language (i.e., <RESPONSE FIELDS="value" [NEXT="value" [NEXTMETHOD="value"]]/> or <RESPONSE FIELDS= "value" [NEXT="value" [NEXTMETHOD="value"]]> SWITCH elements </RESPONSE>) is used to define the behavior of an application in response to different combinations of recognition slots. The response element includes a FIELDS attribute, a NEXT attribute, and a NEXTMETHOD attribute. The value of the FIELDS attribute can be a list of identifiers, the value of the NEXT attribute can be a next step address (i.e., a URL), and the value of the NEXTMETHOD attribute can be a get and a post.

The RESPONSE element enables application developers to define a different NEXT attribute depending on which of the grammar's slots were filled. The RESPONSE element can exist within an INPUT element, and then only when using an input type of grammar.

The following example illustrates the RESPONSE element in a markup language document.

```
<INPUT TYPE="GRAMMAR"
    SRC="gram://.Banking/action/amt/fromacct/toacct"
    NEXT="#notenoughfields">
    <RESPONSE FIELDS="action,amt,fromacct,toacct"
        NEXT=#doit"/>
    <RESPONSE FIELDS="action,amt,fromacct"
        NEXT="#asktoacct"/>
    <RESPONSE FIELDS="action,amt,toacct"
        NEXT="#askfromacct"/>
    <RESPONSE FIELDS="action,amt" NEXT="#askaccts"/>
    <RESPONSE FIELDS="action" NEXT="#askamtaccts"/>
</INPUT>
```

The example shown above illustrates the use of the RESPONSE element where the user specifies less than all the possible variables available in the grammar. Using the RESPONSE element, the application can arrange to collect the information not already filled in by prior steps. In particular, this example transfers to the "askaccts" STEP element if neither the source nor destination account is specified (i.e., the user said "transfer 500 dollars"), but it transfers to the "askfromacct" STEP element if the user said what account to transfer to, but did not specify a source account (i.e., if the user had said "transfer 100 dollars to savings"). The next URL of the INPUT element is used when the user's response does not match any of the defined responses.

The SWITCH element of the markup language (i.e., <SWITCH FIELD="value">vml </SWITCH>) is used to define the application behavior dependant on the value of a specified recognition slot. The switch element includes a FIELD attribute. The value of the FIELD attribute can be an identifier. The SWITCH element is used in conjunction with the CASE element. The SWITCH element can exist within the INPUT element, and then only when using the grammar input type.

The following example illustrates the use of the SWITCH element in a markup language document.

```
<INPUT TYPE="GRAMMAR"
    SRC="gram://.Banking/action/amount/fromacct/toacct">
    <SWITCH FIELD="action">
    <CASE VALUE="transfer" NEXT="#transfer" />
    <CASE VALUE="balance" NEXT="#balance" />
    <CASE VALUE="activity">
        <SWITCH FIELD="fromacct">
            <CASE VALUE="checking" NEXT="#chxact" />
            <CASE VALUE="savings" NEXT="#savact" />
        </SWITCH>
    </CASE>
    </SWITCH>
</INPUT>
```

In the example shown above, the SWITCH element is used to determine the next STEP element to execute in response to a banking request. In this example, the grammar may fill in some or all of the variables (i.e., "action", "amount", "fromacct", and "toacct"). If the user asks for a transfer or balance action, the next STEP element to execute is the transfer or balance step. If the user asks for a report of account activity, a second SWITCH element determines the next STEP element based on the account type for which a report is being requested (assumed to be available in the "ffromacct" variable).

The VALUE element of the markup language (i.e., <VALUE NAME="value"/>) is used to present the value of a variable to the user via the text-to-speech unit. The VALUE element includes a FIELD attribute. The value of the FIELD attribute can be an identifier. The VALUE element can be used anywhere that text is read to the user. The VALUE element can be contained by a PROMPT, EMP, PROS, HELP, ERROR, CANCEL, or ACK element.

The following example illustrates the use of the value element in a markup language document.

```
<STEP NAME="thanks">
    <PROMPT> Thanks for your responses. I'll record
        that <VALUE NAME="first"/> is your favorite
        and that <VALUE NAME="second"/> is your
        second choice.
    </PROMPT>
    <INPUT TYPE="NONE" NEXT="/recordresults.asp" />
</STEP>
```

The example shown above illustrates the use of the VALUE element to read the user's selections back to the user. As shown above, the value of the variable named "first" would be inserted into the PROMPT element, and the value of the variable named "second" would be inserted into the PROMPT element.

The COST attribute of the STEP element of the markup language enables is used to charge a user for various services. The COST attribute can be used in the definition of one of more STEP or CLASS elements. The value of the COST attribute is the integer number of credits the user is to be charged for viewing the content. For example, to charge 10 credits for listening to a particular step element a provider might write the following markup language:

```
<STEP NAME="premiumContent" COST="10">
   . . . premium content goes here . . .
</STEP>
```

If a content provider wishes to maintain a record of subscriber charges, the content provider need only request identifying data for the user using the PROFILE input type as in:

```
<INPUT TYPE="PROFILE" PROFNAME="UID" NAME="subID"/>
```

Using the resulting value and examining the SUB_CHARGE query-string parameter at each page request, the content provider can maintain records on a per-subscriber basis.

Figure 8:
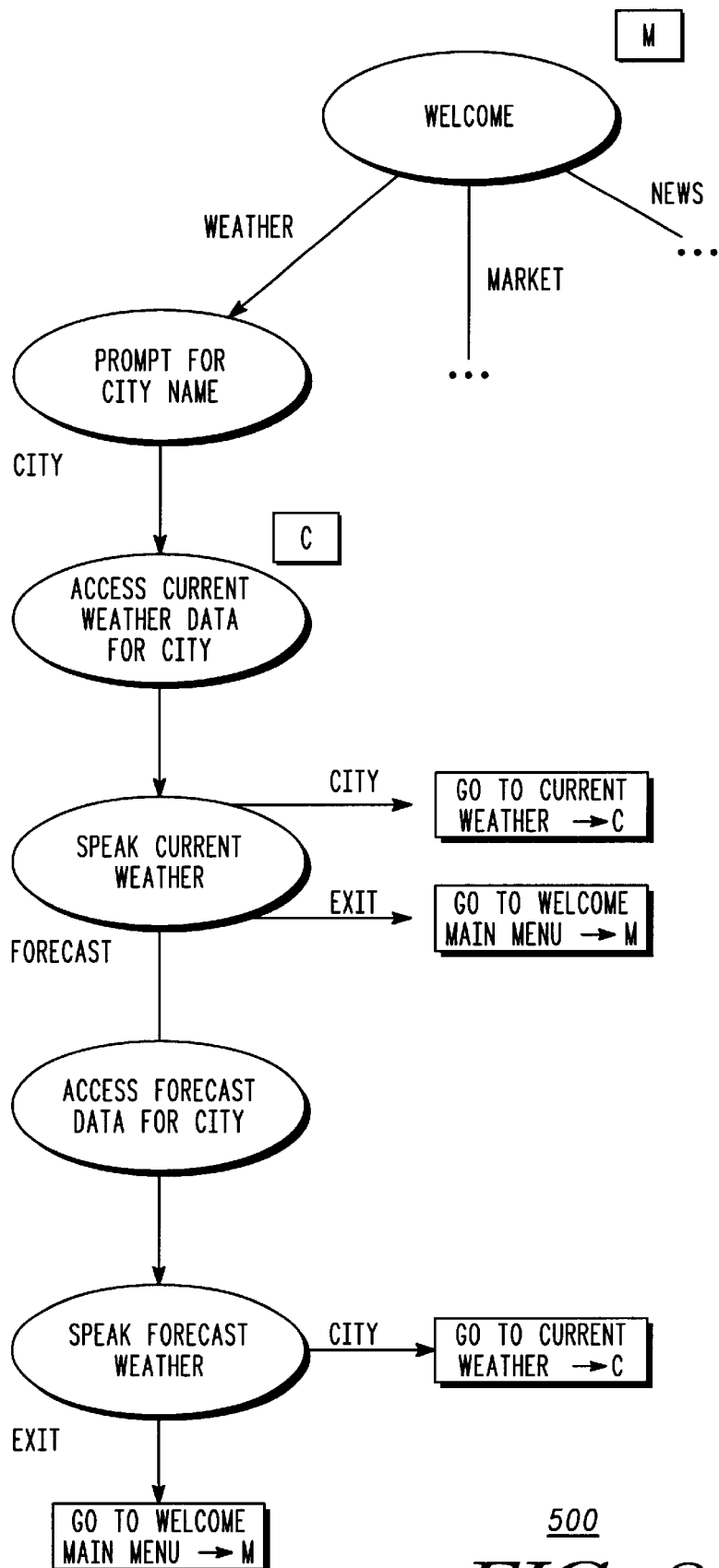
FIG. 8 is an exemplary state diagram of a markup language document.

The following text describes a weather application 500 that can be executed by the system 200 of FIG. 3. FIG. 8 shows an exemplary state diagram of the weather application containing states that prompt the user for input in order to access the weather database. After speaking the current or forecast weather information, the application expects the user to say a city name or the word "exit" to return to the main welcome prompt. The user can select to hear the forecast after the current weather conditions prompt. It will be recognized that the application could be designed to address errors, help and cancel requests properly.

The markup language set forth below is a static version of the weather application. The initial state or welcome prompt is within the first step, init (lines 11–20). The user can respond with a choice of "weather", "market", "news" or "exit". Once the application detects the user's response of "weather", the next step, weather (lines 21–29), begins. The prompt queries the user for a city name. Valid choices are "London", "New York", and "Chicago".

The steps called london_current, london_forecast, newyork_current, newyork_forecast, chicago_current, and chicago_forecast provide weather information prompts for each city. It is noted that Market and news steps are just placeholders in the example (lines 111 and 115).

```
<?XML VERSION="1.0"?>
<!- -
----------------------------------------------------------------
_- ->
   <!- - (c) 1998 Motorola Inc.
- ->
   <!- - weather.vml
- ->
   <!- -
----------------------------------------------------------------
_- ->
   <DIALOG>
   <CLASS NAME="help_top">
      <HELP>You are at the top level menu. For weather information,
      say weather. </HELP>
   </CLASS>
   <STEP NAME="init" PARENT="help_top">
      <PROMPT>Welcome to Genie.<BREAK SIZE="large"/>
      How may I help you? </PROMPT>
      <INPUT TYPE="OPTIONLIST">
         <OPTION NEXT="#weather">weather</OPTION>
         <OPTION NEXT="#market">market</OPTION>
         <OPTION NEXT="#news">news</OPTION>
         <OPTION NEXT="#bye">exit</OPTION>
      </INPUT>
   </STEP>
   <STEP NAME="weather" PARENT="help_top">
      <PROMPT>What city? </PROMPT>
```

-continued

```
      <INPUT TYPE="OPTIONLIST">
         <OPTION NEXT="#london_current">london</OPTION>
         <OPTION NEXT="#newyork_current">new york</OPTION>
         <OPTION NEXT="#chicago_current ">chicago</OPTION>
         <OPTION NEXT="#init">exit</OPTION>
      </INPUT>
   </STEP>
   <CLASS NAME="help_generic">
      <HELP>Your choices are <OPTIONS/>.</HELP>
   </CLASS>
   <STEP NAME="london_current" PARENT="help_generic">
      <PROMPT>It is currently 46 degrees in London,
with rain.
      <BREAK SIZE="large"/>
      To hear the 3 day forecast for London, say
forecast, or say
      another city name, such as Chicago or New York.</PROMPT>
      <INPUT TYPE="OPTIONLIST">
         <OPTION NEXT="#london_forecast">forecast</OPTION>
         <OPTION NEXT="·london_current">london</OPTION>
         <OPTION NEXT="#newyork_current">new york</OPTION>
         <OPTION NEXT="#chicago_current">chicago</OPTION>
         <OPTION NEXT="#init">exit</OPTION>
      </INPUT>
   </STEP>
   <STEP NAME="london_forecast" PARENT="help_generic">
      <PROMPT>London forecast for
      Tuesday. Showers. High of 50. Low of 44.
      Wednesday. Partly cloudy. High of 39. Low of 35.
      <BREAK SIZE="large"/>
      Choose a city, or say exit to return to the main
menu. </PROMPT>
      <INPUT TYPE="OPTIONLIST">
         <OPTION NEXT="#london_current">london</OPTION>
         <OPTION NEXT="newyork_current">new york</OPTION>
         <OPTION NEXT="#chicago_current">chicago</OPTION>
         <OPTION NEXT="#init">exit</OPTION>
      </INPUT>
   </STEP>
   <STEP NAME="chicago_current" PARENT="help_generic">
      <PROMPT>It is currently 31 degrees in Chicago,
with snow.
      <BREAK SIZE="large"/>
      To hear the 3 day forecast for Chicago, say
forecast, or say
      another city name, such as London or New York. </PROMPT>
      <INPUT TYPE="OPTIONLIST">
         <OPTION NEXT="#chicago_forecast ">forecast</OPTION>
         <OPTION NEXT="#london_current">london</OPTION>
         <OPTION NEXT="#newyork_current">new york</OPTION>
         <OPTION NEXT="#chicago_current">chicago</OPTION>
         <OPTION NEXT="#init">exit</OPTION>
      </INPUT>
   </STEP>
   <STEP NAME="chicago_forecast" PARENT="help_generic">
      <PROMPT>Chicago forecast for
      Tuesday. Flurries. High of 27. Low of 22.
      Wednesday. Snow showers. High of 27. Low of 12.
      <BREAK SIZE="large"/>
      Choose a city, or say exit to return to the main
menu. </PROMPT>
      <INPUT TYPE="OPTIONLIST">
         <OPTION
```

-continued

```
NEXT="#london_current">london</OPTION>
        <OPTION NEXT="#newyork_current">new
york</OPTION>
        <OPTION
NEXT="#chicago_current">chicago</OPTION>
        <OPTION NEXT="#init">exit</OPTION>
    </INPUT>
</STEP>
<STEP NAME="newyork_current" PARENT="help_generic">
    <PROMPT>It is currently 39 degrees in New York
City, with
        cloudy skies.<BREAK SIZE="large"/>
        To hear the 3 day forecast for New York, say
forecast, or say
        another city name, such as London or New
York.</PROMPT>
    <INPUT TYPE="OPTIONLIST">
        <OPTION
NEXT="#newyork_forecast">forecast</OPTION>
        <OPTION NEXT="#london_">london</OPTION>
        <OPTION NEXT="#newyork">new york</OPTION>
        <OPTION NEXT="#chicago">chicago</OPTION>
        <OPTION NEXT="#init">exit</OPTION>
    </INPUT>
</STEP>
<STEP NAME="newyork_forecast" PARENT="help_generic">
    <PROMPT>New York City forecast for
        Tuesday. Windy. High of 48. Low of 43.
        Wednesday. Rain. High of 43. Low of 28.
    <BREAK SIZE="large"/>
    Choose a city, or say exit to return to the main
menu. </PROMPT>
    <INPUT TYPE="OPTIONLIST">
        <OPTION
NEXT="#london_current ">london</OPTION>
        <OPTION NEXT="#newyork_current">new
york</OPTION>
        <OPTION NEXT="#chicago.">chicago</OPTION>
        <OPTION NEXT="#init">exit</OPTION>
    </INPUT>
</STEP>
<STEP NAME="market">
    <PROMPT>Market update is currently not
supported. </PROMPT>
    <INPUT TYPE="NONE" NEXT="#init"/>
</STEP>
<STEP NAME="news">
    <PROMPT>News update is currently not supported.
</PROMPT>
    <INPUT TYPE="NONE" NEXT="#init"/>
</STEP>
<STEP NAME="bye" PARENT="help_top">
    <PROMPT>Thanks for using Genie. Goodbye.
</PROMPT>
    <INPUT TYPE="NONE" NEXT="#exit"/>
</STEP>
</DIALOG>
```

Figure 9:
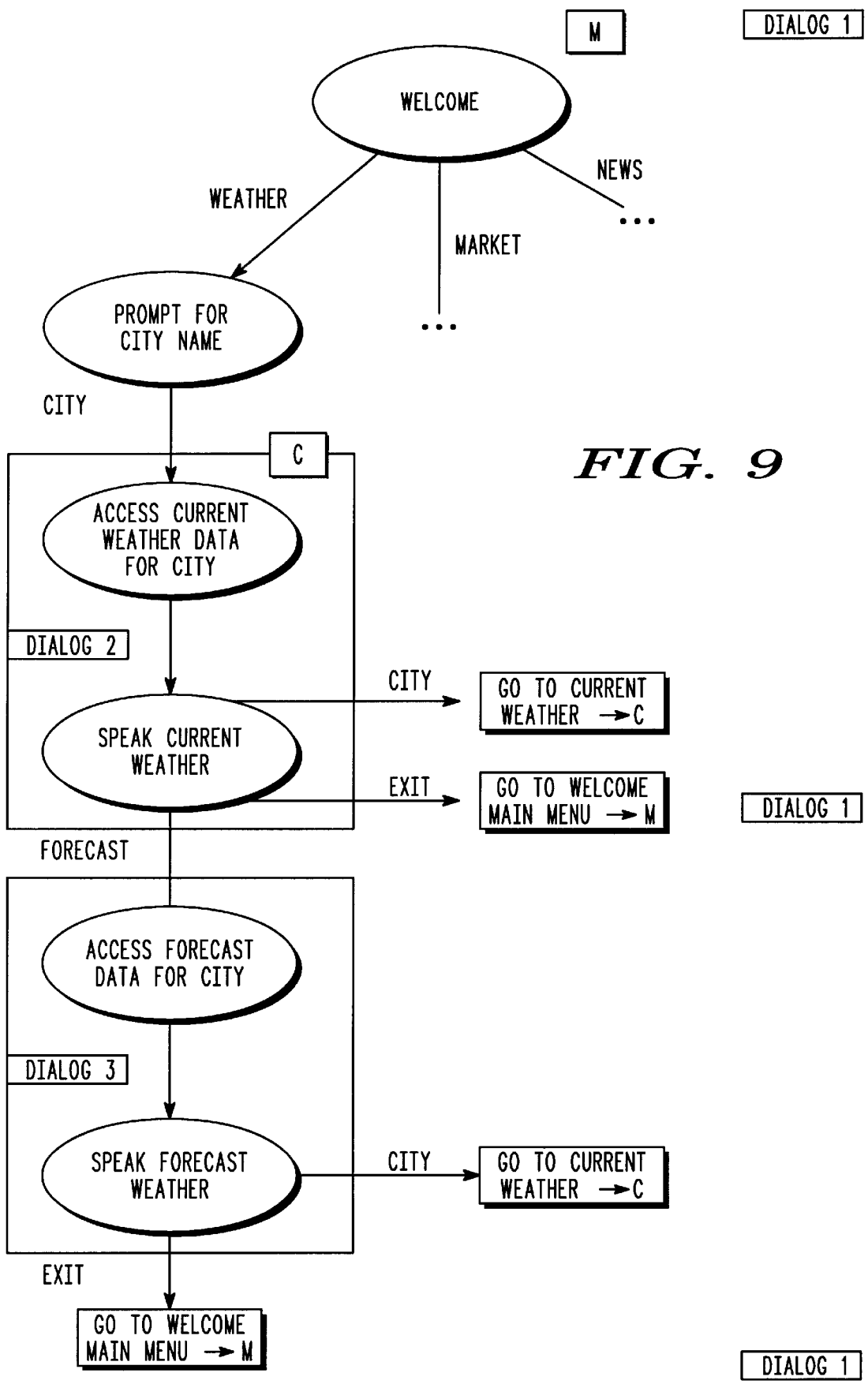
FIG. 9 is another an exemplary state diagram of an exemplary application of a markup language document.

FIG. 9 illustrates the same state diagram for the weather application as shown in FIG. 8 with labels for each dialog boundary. The initial dialog and dialog1 contains the user prompts for welcome and city name. The Dialog1 also controls the prompts for transitioning to hear a city's current or forecast weather and returning to the main menu. Dialog2 handles access of the weather database for the current conditions of the city specified by the user and the information is read to the user. The Dialog2 then returns control to dialog1 again to get the user's next request. Similarly, dialog3 handles access of the weather database for the forecast of the city requested and speaks the information. It returns control to dailog1 to get the next user input.

The markup language set forth below illustrates an example of the weather application corresponding to the dialog boundaries as presented in the state diagram of FIG. 9. The implementation of the application is with Active Server Pages using VBscript. It consists of three files called dialog1.asp, dialog2.asp, and dialog3.asp, each corresponding to the appropriate dialog.

For dialog1, there are two help message types, help_top and help dialog1 (lines 16 and 29). The first step, init, is at line 19. The weather step follows at line 32. Valid city names are those from the citylist table (line 36) of the weather database. Lines 7 and 8 accomplish the database connection via ADO. Line 38 is the start of a loop for creating an option list of all possible city responses. If the user chooses a city, control goes to the step getcurrentweather in dialog2, as shown at line 40. In this case, the city name is also passed to dialog2 via the variable CITY at line 34. The last major step in dialog1 is nextcommand and can be referenced by dialog2 or dialog3. It prompts the user for a cityname or the word forecast. Similar to the weather step, nextcommand uses a loop to create the optionlist (line 53). If the user responds with a city name, the step getcurrentweather in dialog2 is called. If the user responds with the word forecast, step getforecastweather _is called instead.

Dialog2 contains a single step getcurrentweather. The step first reads the city name into local variable strcity (line 95). A database query tries to find a match in the weather database for the city (lines 97 and 98). If there is no weather information found for the city, the application will speak a message (line 101) and proceed to init step in dialog1 (line 110). Otherwise, the application will speak the current weather information for the city (line 105) and switch to the nextcommand step in dialog1 (line 112).

Dialog3 is similar to dialog2. It contains a single step getforecastweather. The database query is identical to the one in dialog2. If there is weather information available for the city, the application will speak the weather forecast (line 105), otherwise a notification message is spoken (line 101). Dialog3 relinquishes control back to dialog1 with either the init step (line 110) or next command (line 112).

```
<%@LANGUAGE="VBSCRIPT" %>
<%
    Option Explicit
    Private objConnection, rsCities
    Private strCity, SQLQuery
    ' Create and open a connection to the database.
    Set objConnection =
Server.CreateObject("ADODB.Connection")
    objConnection.Open "Weather Database"
%>
<?XML VERSION="1.0"?>
<!--
---------------------------------------------------------------
_-->
<!-- (c) 1998 Motorola Inc.
-->
<!-- dialog1.asp
-->
<!--
---------------------------------------------------------------
_-->
<DIALOG>
<CLASS NAME="help_top">
    <HELP>You are at the top level menu. For weather
information,
        say weather. </HELP>
</CLASS>
<STEP NAME="init" PARENT="help_top">
    <PROMPT>Welcome to Genie.<BREAK SIZE="large"/>
    How may I help you? </PROMPT>
    <INPUT TYPE="OPTIONLIST">
        <OPTION NEXT="#weather">weather</OPTION>
        <OPTION NEXT="#market">market</OPTION>
        <OPTION NEXT="#news">news</OPTION>
        <OPTION NEXT="#bye">exit</OPTION>
```

-continued

```
        </INPUT>
    </STEP>
    <CLASS NAME="help_dialog1">
        <HELP>Your choices are <OPTIONS/>.</HELP>
    </CLASS>
    <STEP NAME="weather" PARENT="help_dialog1">
        <PROMPT>What city? </PROMPT>
        <INPUT TYPE="optionlist" NAME="CITY">
            <% ' Get all city names. %>
            <% SQLQuery = "SELECT * FROM CityList" %>
            <% Set rsCities =
objConnection.Execute (SQLQuery) %>
            <% Do Until rsCities.EOF %>
                <% ' Create an OPTION element for each
city. %>
                <OPTION
NEXT="dialog2.asp#getcurrentweather"
                    VALUE="<%=rsCities("City") %>">
                    <%=rsCities("City") %></OPTION>
                <% rsCities.MoveNext %>
            <% Loop %>
            <OPTION NEXT="#init">exit</OPTION>
        </INPUT>
    </STEP>
    <STEP NAME="nextcommand" PARENT="help_dialog1">
        <% strCity = Request.QueryString("CITY") %>
        <PROMPT> To hear the 3 day forecast for
<%=strCity%>,say
            forecast, or say another city name.</PROMPT>
        <INPUT TYPE="optionlist" NAME="CITY">
            <% ' Get all city names. %>
            <% SQLQuery = "SELECT * FROM CityList" %>
            <% Set rsCities =
objConnection.Execute (SQLQuery) %>
            <% Do Until rsCities.EOF %>
                <% ' Create an OPTION element for each
city. %>
                <OPTION
NEXT="dialog2.asp#getcurrentweather"
                    VALUE="<%= rsCities("City") %>">
                    <%= rsCities("City") %></OPTION>
                <% rsCities.MoveNext %>
            <% Loop %>
            <OPTION
NEXT="dialog3.asp#getforecastweather"
                    VALUE="<%= strCity
%>">forecast</OPTION>
            <OPTION NEXT="#init">exit</OPTION>
        </INPUT>
    </STEP>
    <STEP NAME="market">
        <PROMPT>Market update is currentiy not
supported. </PROMPT>
        <INPUT TYPE="NONE" NEXT="#init"/>
    </STEP>
    <STEP NAME="news">
        <PROMPT>News update is currentiy not supported.
</PROMPT>
        <INPUT TYPE="NONE" NEXT="#init"/>
    </STEP>
    <STEP NAME="bye" PARENT="help_top">
        <PROMPT>Thanks for using Genie. Goodbye.
</PROMPT>
        <INPUT TYPE="NONE" NEXT="#exit"/>
    </STEP>
</DIALOG>
<!-- _____End of
Dialog1.asp_____-->
<%@ LANGUAGE="VBSCRIPT" %>
<%
    Option Explicit
    Private objConnection, rsWeather, SQLQuery
    Private strCity, Valid
    ' Create and open a connection to the database.
    Set objConnection =
Server.CreateObject("ADODB.Connection")
        objConnection.Open "Weather Database"
%>
<?XML VERSION="1.0"?>
```

-continued

```
<!--
---------------------------------------------------------------
_-->
<!-- (c) 1998 Motorola Inc.
-->
<!-- dialog2.asp
-->
<!--
---------------------------------------------------------------
_-->
<DIALOG>
    <CLASS NAME="help_dialog2">
        <HELP>Your choices are <OPTIONS/>.</HELP>
    </CLASS>
    <STEP NAME="getcurrentweather">
        <% strCity = Request.QueryString("CITY") %>
        <% Valid = "TRUE" %>
        <% SQLQUery = "SELECT * FROM WDB WHERE( City='"
& strCity & ""
                    )" %>
        <% Set rsWeather =
objConnection.Execute (SQLQuery) %>
        <% If rsWeather.EOF Then %>
            <% Valid = "FALSE" %>
            <PROMPT>Sorry, <BREAK/>There are no current
weather
                    conditions available for
<%=strCity%>.<BREAK/></PROMPT>
        <% Else %>
            <% ' Speak current weather information %>
            <PROMPT><%=rsWeather("Current")%></PROMPT>
        <%End If %>
        <INPUT TYPE = "Hidden" NAME="CITY"
VALUE="<%=strCity%>" >
        </INPUT>
        <% If ( Valid = "FALSE") Then %>
            <INPUT TYPE="none"
NEXT="dialog1.asp#init"</INPUT>
        <% Else %>
            <INPUT TYPE="none"
NEXT="dialog1.asp#nextcommand "></INPUT>
        <% End If %>
    </STEP>
</DIALOG>
<!-- _____End of
Dialog2.asp_____-->
<%@ LANGUAGE="VBSCRIPT" %>
<%
    Option Explicit
    Private objConnection, rsWeather, SQLQuery
    Private strCity, Valid
    ' Create and open a connection to the database.
    Set objConnection =
Server.CreateObject("ADODB.Connection")
        objConnection.Open "Weather Database"
%>
<? XML VERSION="1.0"? >
<!--
---------------------------------------------------------------
_-->
<!-- (c) 1998 Motorola Inc.
-->
<!-- dialog3.asp
-->
<!--
---------------------------------------------------------------
_-->
<DIALOG>
    <CLASS NAME="help_dialog3">
        <HELP>Your choices are <OPTIONS/>.</HELP>
    </CLASS>
    <STEP NAME="getforecastweather">
        <% strCity = Request.QueryString("CITY") %>
        <% Valid = "TRUE" %>
        <% SQLQuery = "SELECT * FROM WDB WHERE( City='" &
strCity & "' )"%>
        <% Set rsWeather = objConnection.Execute(SQLQuery) %>
        <% If rsWeather.EOF Then%>
            <% Valid = "FALSE" %>
```

-continued

```
        <PROMPT> Sorry, <BREAK/> There is no forecast
weather
        available for <%=strCity%>.<BREAK/></PROMPT>
    <% Else %>
        <% ' Speak forecast weather information %>
        <PROMPT> <%=rsWeather("Forecast")%> </PROMPT>
    <% End If %>
    <INPUT TYPE = "Hidden" NAME="CITY"
VALUE="<%=strCity%>" > </INPUT>
    <% If ( Valid = "FALSE") Then%>
    <INPUT TYPE="none" NEXT="dialog1.asp#init"</INPUT>
    <% Else %>
    <INPUT TYPE="none"
NEXT="dialog1.asp#nextcommand"></INPUT>
    <% End If %>
    </STEP>
    </DIALOG>
    <!- - _____End of
Dialog3.asp_____- - >
```

Accordingly, there has been described herein methods and systems to allow users to access information from any location in the world via any suitable network access device. The user can access up-to-date information, such as, news updates, designated city weather, traffic conditions, stock quotes, and stock market indicators. The system also allows the user to perform various transactions (i.e., order flowers, place orders from restaurants, place buy or sell orders for stocks, obtain bank account balances, obtain telephone numbers, receive directions to destinations, etc.)

It will be apparent to those skilled in the art that the disclosed embodiment may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. A markup language document stored on a computer-readable medium to provide interactive services comprising:
   a dialog element including a plurality of markup language elements, each of the plurality of markup language elements being identifiable by at least one markup tag;
   a step element contained within the dialog element to define a state within the dialog element, the step element including a prompt element and an input element;
   the prompt element including an announcement to be read to the user; and
   the input element including an attribute to allow an audible user input to be converted to a text string.

2. The markup language document of claim 1, wherein the attribute includes one of a name attribute, a next attribute, a method attribute, and action attribute and a timeout attribute.

3. The markup language document of claim 2, wherein the name attribute comprises an identifier.

4. The markup language document of claim 2, wherein the next attribute comprises a next step address.

5. The markup language document of claim 1, wherein the method attribute comprises one of a get and post.

6. The markup language document of claim 1 wherein the action attribute comprises a pointer to a script that processes the input on a server.

7. The markup language document of claim 1, wherein the timeout attribute comprises a period of time for the user to enter audible input.

8. The markup language document of claim 1, wherein the attribute comprises a form input.

9. A The markup language document of claim 1, wherein announcement comprises one of voice over internet protocol data and textual data.

10. The markup language file of claim 1, wherein the markup language document contains a begin tag and an end tag for the dialog element.

11. The markup language document of claim 1, wherein the step element further contains one of a name attribute, a bargein attribute, a parent attribute, and a cost attribute.

12. The markup language document of claim 1, wherein a bargein attribute interrupts the step element in response to a selected user input.

13. The markup language document of claim 1, wherein the input element includes an input attribute.

14. The markup language document of claim 13, wherein the input attribute includes one of a date input, a digits input, a grammar input, a hidden input, a money input, a none input, a number input, an optionlist input, a phone input, a profile input, a record input, a time input, and a yorn input.

15. The markup language document of claim 14, wherein the grammar input includes a grammar corresponding to a user input.

16. The markup language document of claim 14, wherein the grammar input includes an electronic address to provide an indication of the location of a grammar.

17. The markup language document of claim 14, wherein the electronic address includes one of a URL and an address of a second step element.

18. The markup language document of claim 14, wherein the grammar input includes a nextmethod attribute having a memory address of a grammar.

19. The markup language document of claim 14, wherein the grammar input includes a selected period of time for the user to enter audio input.

20. The markup language document of claim 14, wherein the input element further contains a hidden input including a variable to store information.

21. The markup language document of claim 14, wherein each of the date input, the digit input, the money input, the number input, the phone input, and the time input includes a predetermined grammar.

22. The markup language document of claim 14, wherein the yorn element defines one of an affirmative response and a negative response.

23. The markup language document of claim 14, wherein the optionlist input includes at least one option corresponding to user input.

24. The markup language document of claim 14, wherein the form input is used to send information to an information source.

25. The markup language document of claim 14, wherein the record input is used to record an audio input from a user for a selected length of time.

26. The markup language document of claim 14, wherein the profile input is used to store user data.

27. The markup language document of claim 1, wherein the dialog element further contains ad option element including at least one option corresponding to a numerical value.

28. The markup language document of claim 1, wherein the dialog element further contains an ack element including a user acknowledgment.

29. The markup language document of claim 1, wherein the dialog element further contains an audio element including audio data to be played to the user.

30. The markup language document of claim 29, wherein the audio data is contained in a voice over internet protocol.

31. The markup language document of claim 1, wherein the dialog element further contains a break element to provide a silent period.

32. The markup language document of claim 1, wherein the dialog element further contains a case element including data to correspond to at least one user input.

33. The markup language document of claim 1, wherein the dialog element further contains a class element including a plurality of elements to be reused with a dialog element.

34. The markup language document of claim 1, wherein the dialog element further contains an emp element to allow at least a portion of a word to be emphasized during playback.

35. The markup language document of claim 1, wherein the dialog element further contains an options element including at least one option for a user to select.

36. The markup language document of claim 35, wherein the options element includes at least one element to be reused in the dialog step.

37. The markup language document of claim 1, wherein the dialog further contains an OR element including alternative options corresponding to the phonetic representation of the user input.

38. The markup language document of claim 1, wherein the dialog element further contains a pros element to define one of a rate of speech, the pitch of speech the range of speech, and the volume of speech to be read to the user.

39. The markup language document of claim 1, wherein the dialog element further contains a response element including a next step element to execute.

40. The markup language document of claim 1, wherein the dialog element further contains a response element including a next step element to execute.

41. The markup language document of claim 1, wherein the dialog element further contains a value element including a variable to store information to be played back to the user.

42. The markup language document of claim 1, wherein the step element includes a cost attribute used to track content usage for billing purposes.

43. A method of creating a voice application program for providing interactive voice services, the method comprising the steps of:

creating a markup language document having a plurality of elements;

selecting a prompt element;

defining a voice communication in the prompt element to be read to the user;

selecting an input element; and selecting an attribute to allow an audible user input to be converted to a text string.

44. A program stored on a computer-readable medium to provide interactive services comprising: a prompt element including a voice communication to be read to a user; and an input element including an attribute to allow an audible user input to be converted to a text string, —has been inserted wherein the attribute includes one of a name attribute, a next attribute, a method attribute, and action attribute and a timeout attribute.

45. The program of claim 44, wherein the name attribute comprises an identifier.

46. The program claim 44, wherein the next attribute comprises a next step address.

47. The program of claim 44, wherein the method attribute comprises one of a get and post.

48. The program of claim 44, wherein the action attribute comprises a pointer to a script that processes the input on a server.

49. The markup language document of claim 44, wherein the timeout attribute comprises a period of time for the user to enter audible input.

50. A markup language document stored on a computer-readable medium to provide interactive voice services comprising:

a dialog element being identified by at least one markup tag; and an input element including an attribute to allow an audible user input to be converted to a text string.

51. A method comprising the steps of:

providing an audible output to a user;

receiving an audible input from the user;

converting the audible input to text; and posting the text to a destination associated with an electronic address.

* * * * *

UNITED STATES PATENT AND TRADEMARK OFFICE
CERTIFICATE OF CORRECTION

PATENT NO.     : 6,493,673 B1
DATED          : December 10, 2002
INVENTOR(S)    : Ladd, David et al.

It is certified that error appears in the above-identified patent and that said Letters Patent is hereby corrected as shown below:

<u>Column 46,</u>
Line 11, delete "-has been inserted"

Signed and Sealed this

Tenth Day of June, 2003

JAMES E. ROGAN
*Director of the United States Patent and Trademark Office*